(12) United States Patent
Zhu et al.

(10) Patent No.: US 11,316,600 B2
(45) Date of Patent: Apr. 26, 2022

(54) IDENTIFYING AND CLASSIFYING DISRUPTIONS AT TERMINAL DEVICES IN DATA TRANSFER NETWORKS

(71) Applicant: CABLE TELEVISION LABORATORIES, INC., Louisville, CO (US)

(72) Inventors: Jingjie Zhu, Erie, CO (US); Jason W. Rupe, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 272 days.

(21) Appl. No.: 16/750,982

(22) Filed: Jan. 23, 2020

(65) Prior Publication Data

US 2020/0235833 A1    Jul. 23, 2020

Related U.S. Application Data

(60) Provisional application No. 62/795,941, filed on Jan. 23, 2019.

(51) Int. Cl.
*H04B 17/345* (2015.01)
*G06N 3/08* (2006.01)
*H04B 1/38* (2015.01)

(52) U.S. Cl.
CPC ............. *H04B 17/345* (2015.01); *G06N 3/08* (2013.01); *H04B 1/38* (2013.01)

(58) Field of Classification Search
CPC ........... H04B 17/345; H04B 1/38; G06N 3/08
See application file for complete search history.

(56) References Cited

U.S. PATENT DOCUMENTS

| | | | |
|---|---|---|---|
| 2011/0242976 A1* | 10/2011 | Gusat | H04L 47/10 370/230 |
| 2019/0036627 A1* | 1/2019 | Toosi | H04B 17/309 |
| 2019/0042867 A1* | 2/2019 | Chen | G06N 3/063 |
| 2019/0385057 A1* | 12/2019 | Litichever | H04L 63/1416 |

* cited by examiner

*Primary Examiner* — Duc C Ho
(74) *Attorney, Agent, or Firm* — David Daniel Smith

(57) ABSTRACT

Systems and methods for classifying interference in data signals received by a terminal device (or other end-user or endpoint device) transacting data in a data transfer network are disclosed. Embodiments include defining an array of signal quality metrics at the terminal device, where each signal quality metric is associated with a subcarrier of a data channel used to transfer data with the data transfer network. The array of signal quality metrics may be input to a classification model and the classification model may output a type, sources, and/or cause of disruptions such as interference identified in the signal quality data. In some cases, the output may include frequency characteristics such as a center frequency and/or bandwidth of the identified signal disruption. The terminal device may transmit a message to an upstream device of the data transfer network, which may indicate the identified interference.

29 Claims, 17 Drawing Sheets

IDENTIFYING AND CLASSIFYING DISRUPTIONS AT TERMINAL DEVICES IN DATA TRANSFER NETWORKS

CROSS-REFERENCE TO RELATED APPLICATION

This application is a nonprovisional of, and claims the benefit under 35 U.S.C. § 119(e) of, U.S. Provisional Patent Application No. 62/795,941, filed on Jan. 23, 2019, and entitled "Proactive CPE," the contents of which are incorporated by reference in its entirety.

TECHNICAL FIELD

The described embodiments generally relate to network maintenance systems and, in particular, to systems and processes for identifying and classifying signal disruptions negatively affecting end-user devices and other network appliances coupled to data transfer networks.

BACKGROUND

Network operators typically use centralized network maintenance systems to detect and locate sources of signal quality issues that may negatively affect one or more end-user devices (and/or or other networking appliances) of a data transfer network. In conventional centralized network maintenance system architectures, end-user devices are individually queried on a schedule or on demand. In response to each query, each end-user device collects, stores, and/or transmits information characterizing data transfer rates (and/or other signal quality metrics) over the network to that specific end-user device. By aggregating and analyzing information received from multiple end-user devices, a conventional centralized network maintenance system can determine and locate likely causes of signal quality issues affecting the network and can schedule or perform network maintenance based on those determinations.

However, in many cases, processes of scheduling requests for, collecting, and analyzing network data from end-user devices, and/or other network appliances, in a network may be resource intensive and time consuming. Further, due to inherent latencies between requests to, and responses from, end-user devices, conventional network maintenance systems are typically unable to detect transient network issues.

SUMMARY

Embodiments described herein may relate to, include, or take the form of a method for identifying and classifying interference affecting signals received from a data transfer network at a modem, the method can include defining an array of signal quality metrics, where each signal quality metric is associated with a respective subcarrier of a data channel used to transact information with the data transfer network. It will be understood that one or more signal quality metrics may be used instead of an array of signal quality metrics. For example, detecting when a voltage threshold value is above/below the threshold. The detection model could also look at the single signal quality metric values over time to find anomalies. The method may also include providing the array of signal quality metrics as input to, as one example, a classification or localization model, and receiving from the classification model a label corresponding to an identified interference with normal operation of the data transfer network. In some implementations, the classification or localization model can be further configured to output one or more supplemental data items that identify or quantify one or more properties of the identified interference, such as a bandwidth or center frequency of the identified interference. The label may include at least one of a center frequency of the identified interference, a bandwidth of the identified interference, or a source of the identified interference. The method may further include transmitting a message, including the label, to an upstream device of the data transfer network.

In some embodiments the classification model may be executed on the modem of a data transfer network and the model may transmit the message to a modem termination system.

Some embodiments may include a configuration in which the array of signal quality metrics includes modulation error ratios for the signals received at the modem. The classification model may be configured to output the label at least partially based on identifying interference from the modulation error ratios of the signals received at the modem.

Some embodiments may include a configuration in which transmitting the message further includes transmitting a time associated with the signals received at the modem.

Some embodiments may include a configuration in which the label includes one or more of wireless signal ingress, a roll-off, a roll up, a suck-out, channel sweeping, or a standing wave.

Some embodiments may include receiving, from the classification model, an identifier of a root cause of the interference, where the identifier of the root cause is associated with one or more physical components of the data transfer network. Embodiments may also include sending the identifier of the root cause to the upstream device of the data transfer network.

Some embodiments may include a configuration in which the classification model includes a convolutional neural network configured to operate on the modem of the data transfer network. The convolutional neural network may be configured to identify the interference affecting the signals using the array of signal quality metrics, and output the label (and/or other supplemental data items, such as center frequency or bandwidth) corresponding to the source of the identified interference.

Some embodiments may include a configuration in which the convolutional neural network includes an executable program, and a parameter model for use by the executable program. The parameter model may be used to configure the convolutional neural network to identify the interference affecting the signals.

Some embodiments may include receiving, from the upstream device, a request for additional information associated with the detected interference, and sending, to the upstream device, at least a portion of the array of signal quality metrics associated with the anomaly.

Some embodiments may include receiving, from the upstream device, a request to perform additional analysis on the one or more data channels in the data transfer network.

Embodiments described herein may relate to, include, or take the form of a method for identifying disruptions in signals received at a network terminal (also called herein "a terminal"), the method including at least determining an array of signal quality metrics for one or more data channels in a data transfer network. Each signal quality metric may be associated with a respective subcarrier of a data channel used to transfer information over the data transfer network. The method may include receiving the array of signal quality metrics at a classification model operating on the network terminal, where the classification model includes a neural network and outputting, from the classification model, a label of an identified disruption affecting the signals received at the network terminal. The label may indicate a source of the disruptions identified by the neural network, and transmit a notification of the identified disruption to an upstream device of the data transfer network.

Some embodiments may include a configuration in which determining the array of signal quality metrics includes calculating a modulation error ratio for each signal quality metric in the array of signal quality metrics.

Some embodiments may include a configuration in which the classification model includes a one-dimensional convolutional neural network, and identifying the disruptions includes training the one-dimensional convolutional neural network to recognize the disruptions in the array of signal quality metrics.

Some embodiments may include receiving, from the classification model, an indication of the cause of the identified disruption.

Some embodiments may include transmitting the indication of the cause of the identified disruption to the upstream device.

Some embodiments may include a configuration in which the label includes wireless signal ingress, a roll-off, channel sweeping, a standing wave, or a combination thereof.

Some embodiments may include a configuration in which transmitting the label to the upstream device further includes indicating a severity of the disruptions in the signals.

Embodiments described herein may relate to, include, or take the form of a networked interference identifying system for identifying interference in a data transfer network. The networked interference identifying system may include an upstream device configured to transfer data using data channels to transact information over the data transfer network, a terminal device communicably coupled to the upstream device via the data transfer network, and a processor configured to receive the data from the upstream device via the data channels. The networked interference identifying system may determine an array of signal quality metrics associated with subcarriers of the data channels, provide the array of signal quality metrics as input to a classification model, and receive a label from the classification model. The label may characterize a type of interference affecting the data received at the terminal device. The networked interference identifying system may be configured to transmit a message to the upstream device indicating that the type of interference was detected in the data.

Some embodiments may include a configuration in which the classification model includes a convolutional neural network configured to identify the type of interference as one of a set of known interference types.

Some embodiments may include a configuration in which the convolutional neural network includes an executable file configured to analyze the array of signal quality metrics, and a parameter model utilized by the executable file to configure one or more nodes of the convolutional neural network to identify the type of interference in the array of signal quality metrics.

Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems, examples include without limitation satellite Wi-Fi networks, optical networks, DOC-SIS networks, MIMO communication systems, microwave communication systems, short and long haul coherent optic systems, mobile networks (including but not limited to those defined by 3GPP such 3G, 4G, 5G, 6G networks), etc. To simplify description, a termination unit such as a CMTS, an ONT, an OLT, a Network Termination Units, a Satellite Termination Units, and other termination systems are collectively called a "Modem Termination System (MTS)". To simplify description a modem such as a satellite modem, a cable modem, an Optical Network Units (ONU), a DSL unit, a Remote Radio Head (RRH), eNodeB, gNodeB, small cell, etc. collectively called a "modem." Further, to simplify description a protocol such as DOCSIS, EPON, RFOG, GPON, Satellite Internet Protocol, 3G, 4G, 5G, 6G, protocols, is called a "protocol." When applying the present idea in some Optical and Wireless networks changes or modifications may be applied to the model(s) and/or algorithm(s), although the concept is the same and would be evident to the skilled artisan after understanding the present description and associated figures. In a Wi-Fi application the same systems and methods, may be applied to, for example, OFDM and/or OFDMA, amongst other detections. In Optical and 3GPP defined protocols (LTE, 3G, 4G, 5G, 6G) the present system and method may be utilized to analyze data series over time in the ONU (in optical systems) and an Remote Radio Head (RRH) or portion of an RRH (for example in a split or virtualized small cell/RRH).sd

BRIEF DESCRIPTION OF THE DRAWINGS

Reference will now be made to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The use of the same or similar reference numerals in different figures indicates similar, related, or identical items.

Figure 1A:
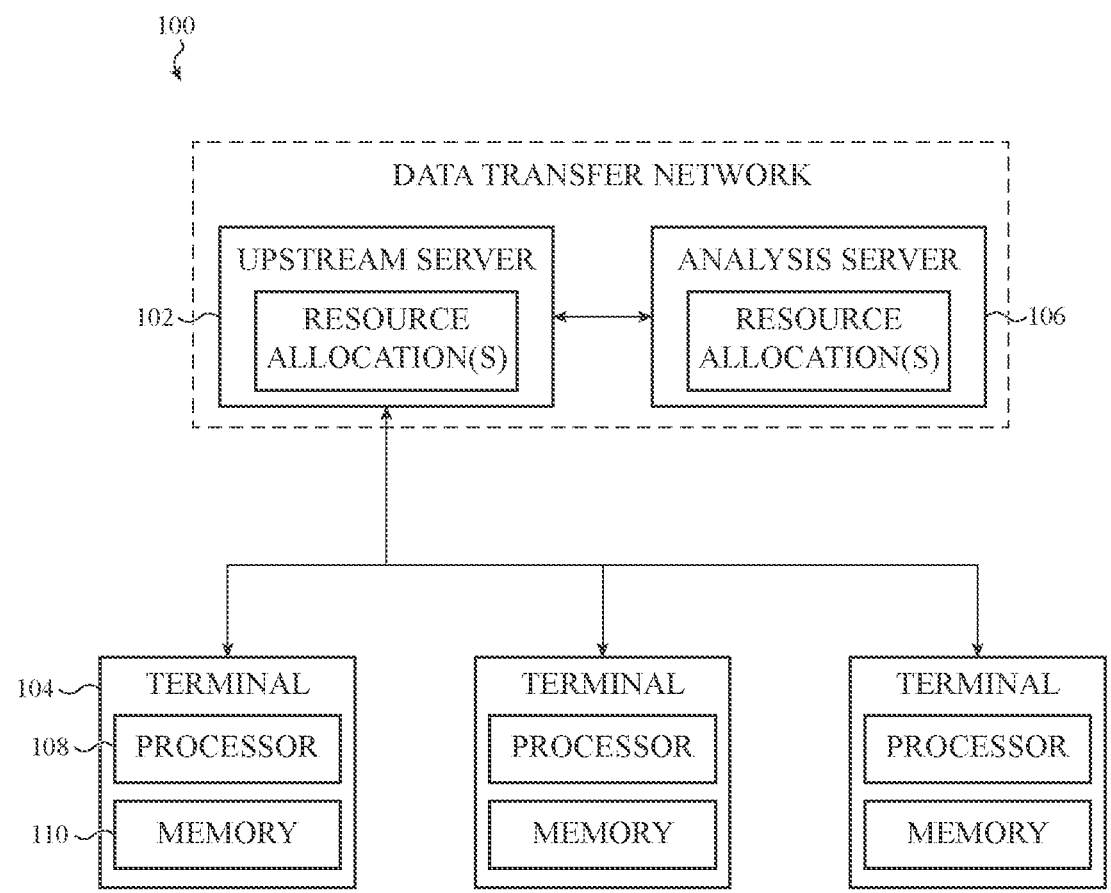
FIG. 1A depicts an example schematic representation of a network maintenance system, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate understanding of the various embodiments described herein and may not necessarily be presented or illustrated to scale, and are not intended to indicate any preference or requirement for an illustrated embodiment to the exclusion of embodiments described with reference thereto.

DETAILED DESCRIPTION

Embodiments described herein relate to network management and network maintenance. In particular, systems and methods described herein leverage underutilized computational capacity of end-user devices (also referred to as "terminal devices") of a data transfer network, such as customer modems or other networking appliances, to (1) automatically perform signal quality analysis operations against signal quality data already captured by the terminal device and (2) to identify, quantify, and label likely causes and/or sources of any unexpected interference that may negatively affect upstream and/or downstream communications between the terminal device and the data transfer network. Once a terminal device has labeled and quantified one or more likely causes and/or sources of interference, the terminal device can communicate the label and any other associated data to an upstream device of the data transfer network.

As a result of architectures described herein, an upstream device of a data transfer network can subscribe to, or otherwise listen for or receive, messages, events, and/or notifications containing labeled interference source/cause data from an arbitrary number of terminal devices without: a requirement to query those terminal devices individually; a requirement to establish secure communication channels with those terminal devices in order to receive file transfers of signal quality data from each terminal device; without having to analyze or aggregate data from multiple terminal devices; and so on. Systems described herein can therefore operate substantially more efficiently and expeditiously than conventional centralized network maintenance systems.

More specifically, in some embodiments, systems described herein can be configured to identify, label, and quantify network interference issues on a near real-time basis by providing sub-channel signal quality data for one or more channels of a network communication protocol as input to a trained convolutional neural network configured to label common sources of network interference, such as interference originating from a wireless network or interference resulting from faulty shielding.

For example, in one implementation, a model convolutional neural network can be defined, at least in part, by a first data file transmitted to a terminal device, such as described herein. A trained configuration for the model convolutional neural network (defined by the first data file) can be defined, at least in part, by a second data file transmitted to the terminal device that includes a set of coefficients or other scalar or vector values defining a trained state for the model. Therewith, a processor of the terminal device can instantiate a model convolutional neural network according to the first data file, configure that instance according to the second data file, and can consume sub-channel signal quality data and can output a label identifying an interference source or cause, a bandwidth of the identified interference source or cause, and/or a central frequency of the identified interference source or cause.

For example, an instance of a trained model executed by a processor of a terminal device, such as described herein, can consume an array of scalar values, in which each entry of the array corresponds to a signal-to-noise ratio of a subcarrier of a given channel of wireless or wired communication across a data transfer network. In these examples, the trained model instance may provide output including a payload with three discrete values, one identifying an interference source (e.g., faulty grounding resulting in 60 Hz ingress), a second identifying a center frequency (e.g., 60 Hz), and a third identifying a bandwidth of that interference (e.g., 5 Hz). In these embodiments, output from the trained model instance (which may include the payload) can be communicated to an upstream device for further analysis or processing.

In these and related examples, as may be appreciated by a person of skill in the art, a quantity of information communicated across a backhaul coupling the terminal device and the upstream device is substantially reduced when compared against conventional centralized network management systems. Similarly, the upstream device of embodiments described herein need not perform substantial computational work to analyze outputs from individual terminal devices; the computational work of identifying and labeling interference sources and/or causes is performed by terminal devices themselves. As a result of this construction, analysis of signal quality data, such as sub-channel signal quality data, of a large and distributed network can be performed in a parallel manner; each individual terminal device can execute a separate instance of the same (or different) trained convolutional neural network and, therewith, can perform its own signal quality analysis operation(s) at any suitable frequency, according to any suitable schedule, and/or in response to a request to perform such analysis.

It may be appreciated that the foregoing example is not exhaustive of the various possible configurations or uses of a system such as described herein. In particular, it may be appreciated that a trained convolutional neural network is merely one example of a system configured to recognize and label patterns in a given set of input data. Other examples of computer or machine learning algorithms may be possible and, likewise, other algorithms and/or pattern recognition frameworks or techniques may be suitable in other implementations or other configurations. Similarly it may be appreciated that other embodiments or implementations may consume different and/or additional data. For simplicity of description and illustration, many embodiments described herein reference a configuration in which terminal devices of a data transfer network instantiate a model convolutional neural network according to one or more configuration files (which may be local to each terminal device or, in other examples, may be retrieved from a remote resource) and consume sub-channel signal quality data to output at least a label identifying a source and/or cause of interference with communications across the data transfer network. It is appreciated, however, that this is merely one example and that other configurations are possible.

In view of the foregoing, generally and broadly, embodiments described herein reference systems and methods for collecting data describing the status of a data transfer network by leveraging an edge computing architecture in which terminal devices of that network perform pattern recognition operations, which may be executed in whole or in part by a trained model, and to transmit the results of those operations to one or more upstream devices. The upstream device(s) can aggregate data received from multiple terminal devices and can perform analysis therewith that can be used to, without limitation: request more information from terminal devices; inform network maintenance or scheduling; opening or closing of trouble tickets or issue reports; inform logistics for assigning jobs to field technicians; and so on.

For example, in one embodiment, a terminal device may be a cable modem coupled to a cable telecommunications network. In this example, at a suitable time (which may be during an idle state of the cable modem or, in other examples, during a low utilization state), the cable modem can leverage an internal processor to execute an instance of a convolutional neural network trained to identify signal suck-out that results from cellular communications nearby the cable modem. The model instance executed by the internal processor can consume signal quality data in the form of modulation error ratios such as received modulation error rate ("RxMER") metrics and can output an identification of, as one example, Long Term Evolution ("LTE") ingress. The cable modem can signal an upstream device, such as a data aggregation server, a message including a timestamp and an indication that an "LTE ingress" has been detected by the cable modem. Leveraging this information along with information received from other cable modems in the area, the data aggregation server can readily determine whether the detected LTE ingress is customer-specific, amplifier specific, node specific, trunk specific, head end specific, and so on. In this manner, and as a result of this edge computing architecture, the source and/or physical location of the LTE ingress can be quickly identified and a curative action can be readily taken. In other cases, other licensed or unlicensed bands of radio or microwave frequency ingress may be identified by a system such as described herein, including shortwave bands, FM radio bands, AM radio bands, HAM radio bands, maritime radio bands, other cellular communications bands, and so on. In further implementations, acoustic or optical communication anomalies through various transmission mediums may be identified and/or localized according to methods described herein.

More generally, embodiments described herein provide examples of systems and methods for identifying and classifying network disruptions (also referred to as "interference" or network "anomalies") at terminal devices or other networking appliances of a data transfer network. Examples include, but are not limited to: modems; routers; network switches; gateways; cable modem termination system appliances; cellular head units; backhaul appliances; or the like. The systems and methods described herein may be useful in continuously analyzing data signals received at a terminal device of a data transfer network to identify and/or classify disruptions that may affect performance of the data transfer network.

In some instances, embodiments may be directed to performing frequency-level analysis (e.g., spectrum analysis, frequency transformations, and the like) at a terminal device of a data transfer network to determine whether data signals transmitted with specified carriers are experiencing disruptions such as noise, signal distortions, or the like. In such examples, the terminal device of a data transfer network may be configured to perform operations including but not limited to capturing signal quality metrics such as modulation error ratios including RxMER, spectrum capture, pre-equalization data, signal to noise ratios, channel estimation coefficient data, and the like. The terminal device may be further configured with one or more analysis programs, algorithms, or trained models to detect disruptions in data signals that the terminal device receives. In some cases, the terminal device may continuously monitor incoming data signals to identify disruptions and to inform an upstream device, such as a modem termination system, when such signal disruptions are detected. As noted above, supplemental data describing identified signal disruptions may also be transmitted to upstream devices. Examples include, but are not limited to: bandwidth of an identified disruption; center frequency of an identified disruption; label or probable label of an identified disruption; time at which an identified disruption occurred; duration of an identified disruption; magnitude of an identified disruption; and so on.

In some instances, as noted above, embodiments are directed to using machine learning to identify and/or classify specific types of disruptions affecting data signals. For example, in some embodiments, a terminal device may be configured with a classification model that analyzes signal quality metrics (e.g., RxMER, spectrum capture, pre-equalization data), other frequency data, or other operational metrics (e.g., timing of disruptions, temperature data, physical disruptions, etc.) to identify or otherwise label specific disruptions affecting signal quality of network transactions.

It may be appreciated that a classification model is merely one example machine learning architecture or pattern identification technique, and that other embodiments may be implemented with additional or alternative pattern recognition, feature localization, or feature classification techniques. Similarly, it may be appreciated that operations of feature localization (e.g., finding a location or frequency range of a disruption within signal quality metric data), feature labeling (e.g., identifying a type or classification of a particular feature from signal quality metric data), and the like may be performed in whole or in part without leveraging machine learning. For example, auto or cross correlation may be used in certain embodiments for both feature localization or identification. Accordingly, although it is appreciated that many implementations are possible (some of which may leverage machine learning and some of which may not), for simplicity of description, many embodiments that follow reference a "classification model" as an example type of a pattern recognition technique leveraged by a terminal device, such as described herein.

For example, a classification model may be executed by a terminal device to analyze RxMER data collected by the terminal device. The classification model may be configured to, or trained to, identify, label, and/or classify specific types or causes of disruptions such as suck-out, broadband attenuation, ingress noise, roll-off, roll-up, standing waves, channel sweeping, or the like. The classification model may output a type of disruption and the terminal device may alert, notify, message, or otherwise inform an upstream device of the data transfer network and/or other devices located within a same node, trunk, or branch of the network, or may take other action in response to detecting and identifying one or more disruptions.

In some instances, embodiments may be directed to a terminal device configured to leverage a detected disruption to perform one or more functions. In some cases, a terminal device may store metric quality data (associated with an identified disruption) and may alert an upstream device of the detected disruption. In these examples, the terminal device may continue to monitor signal quality metrics to determine whether the identified disruption was a transient event or whether the identified disruption persists. In some cases, the terminal device may be configured to determine a severity of one or more disruptions and escalate the issue by sending a higher priority alert to an upstream device. This alert may include the type of disruption identified by the classification model, signal quality data associated with the disruption, or the like, for the upstream device to perform further analysis.

In some instances, as noted above, embodiments may be directed to a configuration in which a classification model includes a neural network operating on a terminal device. The classification model can be leveraged to identify specific types of disruptions in received data signals. The neural network may be configured to be executed by processing hardware of a terminal device, such as a main processor, a graphics processing unit, a coprocessor, and so on. For example, the neural network may be executed or instantiated by a processor of a modem located at a customer premises.

As with other embodiments described herein, the neural network may be trained to recognize specific disruptions or types of disruptions that affect data communications at terminal devices. In some cases, the neural network may be configured to efficiently execute analysis operations with low-power processors such that the neural network can continuously or nearly continuously analyze received signal data to capture disruption events occurring at the terminal device. In these examples, the neural network can be further configured to monitor changes in an identified disruption, interference, or anomaly over time.

In some instances, embodiments may be directed to a configuration in which classification models instantiated at different terminal devices throughout a data transfer network communicate with one another. In some cases, each terminal device of a data transfer network may independently analyze received signal data using a classification model and may communicate results of execution of those models with one another. For example, terminal devices of a data transfer network may each identify, collect, and store disruption events that occurred over their respective received data signals received from the data transfer network. In other examples, one terminal device identifying a particular disruption may trigger other adjacent or nearby (e.g., on the same node, trunk, or branch) terminal devices to initiate a detection operation or, in other examples, initiate a disruption-specific detection operation (e.g., selecting a specific classification model from a set of classification models based on the detect anomaly). In these examples, adjacent terminal devices can be leveraged to quickly confirm the presence of, or determine the scope or extent of, a particular disruption.

In some cases, signal disruption data from multiple different terminal devices may be leveraged to diagnose issues affecting multiple terminals devices, multiple nodes, multiple branches, multiple trunks, and so on in a data transfer network.

For example, a modem termination system may receive signal disruption data from multiple different terminal devices. The modem termination system may use this data to identify commonalities such as types of disruptions, whether the disruptions are localized to specific nodes of the network, or the like. In some cases, the modem termination system may request additional information from the modems or instruct the terminal devices to perform additional monitoring or analysis. In some examples, the modem termination system may send or activate additional classification models stored at the terminal devices to perform additional monitoring to aid in diagnosing network issues.

The foregoing examples are not exhaustive. More generally and broadly, as described herein, terminal devices may communicate directly with each other to aid diagnosis of network disruptions. For example, a first modem device may identify a disruption in received data signals and send a message to a second, nearby modem device, to determine if the event is isolated to the first modem or if other modems in the same region (e.g., network node) are experiencing similar problems. In some cases, such diagnosis may also be sent to a modem termination system, for example, a cable modem termination system servicing a particular node of the network.

It may be appreciated that performing identification and classification of network disruption events at terminal devices using one or more classification models provides advantages to a network maintenance system. In particular, identifying and classifying signal disruptions at terminal devices of a network can reduce resource load on a network by reducing the quantity of, and frequency at which, data used for network monitoring is transacted between terminal devices and upstream devices. For example, for embodiments described herein, a terminal device may continuously analyze data, but only send messages, events, notifications, or other digital communications (which may be encrypted) to upstream devices when the terminal device detects and correctly identifies one or more disruptions, for example, by identifying a specific disruption with a certain degree of confidence.

The operation of continuously analyzing received signals by a terminal device increases a likelihood that the terminal device detects persistent and transient events alike that may occur from time to time in data communications within a data transfer network.

In some examples, a terminal device such as described herein may store data when that terminal device identifies a disruption or, in other cases, may store signal quality data for later (local) analysis. In these examples, a terminal device may batch, enqueue, or otherwise schedule sending of, signal disruption data and/or signal quality data upstream devices to a time at which resources of the terminal device are available or otherwise underutilized (e.g., a processor utilization metric and/or memory utilization metric falls below a threshold), such as overnight.

In still further embodiments, a system such as described herein can leverage terminal devices to train or retrain a classification model (or other machine learning model) based on data or information available to the terminal device itself. In one example, a reinforcement learning paradigm may be leveraged by a system described herein to incentivize individual terminal devices to more accurately and/or more quickly identify anomalies or interference sources experienced by that terminal device.

For example, in some embodiments, a terminal device configured to perform training operations can receive labeled training data from a remote resource, such as an upstream device as described herein. In other cases, the terminal device may perform training operations with label data generated by the terminal device itself that has been verified as accurate by an upstream device and/or by another terminal device. For example, a first terminal device may perform an interference identification operation, such as described herein, against sub-channel signal quality data. In some examples, a label or localization determination made by the first terminal device may not be associated with a statistical confidence that exceeds a given threshold.

For example, the first terminal device may identify an LTE ingress with only 30% confidence. In such embodiments, the first terminal may query one or more other terminal devices or upstream devices to determine whether those devices identified a similar anomaly with greater confidence. In one example, a second terminal device closer to a shielding fault may readily identify the same LTE ingress with 80% confidence. In these examples, the first terminal device may leverage the information output from the second terminal device to train its own classification model to more accurately identify low-confidence LTE ingress in future interference identification operations. In these examples, controls and/or limitations may be utilized by the system and/or by the terminal device to prevent and/or mitigate overfitting by each terminal device.

In these and related embodiments, training data generated by one or more terminal devices can be periodically uploaded to an upstream device such that models may be compared between devices and all models may be improved.

In further examples, a terminal device may leverage and/or utilize (for training or other identification/localization purposes) other sensors or inputs available to the terminal device. For example, and without limitation, a terminal device can utilize information such as: temperature data output from a temperature sensor; humidity data output from a humidity sensor; brightness data from a light sensor; timestamp information retrieved from a system clock; utilization history or statistics information; power regulation/consumption information (either power consumption by the terminal device itself or power consumed by an accessory device powered by the terminal device or via a pass-through power coupling provided by the terminal device); and so on.

Such supplemental information may be useful to identify patterns in interference which, in turn, may assist a system such as described herein in diagnosing a source or cause of unknown interference.

Similar to other embodiments described herein, terminal devices may perform training operations, if any, at times when physical resources (e.g., processor, memory, and so on) of the terminal device are underutilized or otherwise not utilized. For example, terminal devices may perform training operations at night when terminal device utilization is expected to be low. In still further examples, terminal device training operations may be paused or otherwise halted in response to an increase in utilization of physical resources of the terminal device. In a more simple and non-limiting phrasing, a terminal device may perform operations described herein, including training operations and interference identification and/or localization operations, when a primary task of the terminal device is not being performed. In one specific example, a terminal device is a cable modem; training operations and/or interference/localization operations of the cable modem may be performed when the cable modem is not otherwise transferring data (e.g., at night, mid-day, off-peak hours, and so on).

Further to the foregoing example, in many embodiments, a terminal device such as described herein may be configured to transmit information to an upstream device if an anomaly is detected but a label and/or localization of that anomaly or interference cannot be confidently identified. For example, a terminal device configured such as described herein may be able to identify that an anomaly and/or interference has occurred within a particular band at least as a result of lower signal to noise ratios within that band. However, the terminal device may not be confident to assign a label to that interference. In such examples, the terminal device may be configured to notify an upstream device that an anomaly may be present that that more information (e.g., from other terminal devices on a similar node, branch, trunk, and so on) may be required before a source of the interference can be identified.

In other cases, once a terminal device makes a determination that an anomaly exists that cannot be identified, the terminal device may, autonomously, switch models used to classify and/or localize anomalies. In other words, in some embodiments, a terminal device can be equipped with and/or may have access to multiple "tiers" of trained classification models, some of which may require more computational resources than others and some of which may have higher accuracy than others. In these examples, if one model fails to accurately identify an anomaly, a second model can be selected. In these and related examples, a terminal device may be configured to compare data to be analyzed (or that cannot be analyzed) by comparing said data to baseline data, which may be unique to each terminal device.

Alternatively, a second interference identification/localization operation can be enqueued to be performed with a second model at a later time. A terminal device may continue to select new or different models (and/or request different training data from upstream devices or other terminal devices) until a confident identification can be made. In still further examples, a terminal device may be configured to transmit all or some of its own sub-carrier signal quality data to one or more other terminal devices or upstream devices; such devices may be selected based on availability of computational resources (e.g., devices with higher workloads may not be selected, devices with lower workloads or no present workload may be selected).

In one example, and in another non-limiting phrasing, a terminal device incapable to identify an anomaly may transmit its own subcarrier signal quality data to another terminal device that is not busy in order to determine whether the second terminal device can affirmatively identify an anomaly in the data provided by the first device.

In response to a notification or other message from a terminal device that the terminal device cannot identify a particular anomaly, a system such as described herein may cause the terminal device to collect a different quantity of data and/or may instruct the terminal device to utilize a particular trained model. In these examples, a system such as described herein may be further configured to identify when a particular terminal device regularly or periodically misidentifies or mislocalizes one or more interference effects. Such examples may be leveraged by a system such as described herein to identify models in need of additional training.

These foregoing examples are not exhaustive; it may be appreciated that as described herein a terminal device may be configured to perform any number of suitable operations, with one or more trained models or other pattern recognition utilities (whether used in parallel, in sequence, or in a hierarchy or specific order), to identify and/or localize any number of interference effects (which may coexist and/or overlap). Further, it may be appreciate that as described herein a terminal device may be configured to perform one or more training operations, may be configured to respond to or make identification or training requests from other terminal devices or upstream devices, may be configured to notify other devices (upstream devices or terminal devices or other devices) of a failure to identify an anomaly, and so on. Accordingly, for simplicity of description, many embodiments that follow reference a terminal device configured to perform identification and/or localization operations. It may be appreciated, however, that terminal devices may be configured to perform additional operations the results of which can be leveraged by a system such as described herein.

These and other embodiments are discussed below with reference to FIGS. 1-14. However, those skilled in the art will readily appreciate that the detailed description given herein with respect to these figures is for explanatory purposes only and should not be construed as limiting.

FIG. 1 is a schematic representation of a network maintenance system. In the illustrated embodiment, the network maintenance system 100 is implemented with a data transfer network architecture including an upstream server 102 that communicably couples (e.g., via one or more networking or wired or wireless communication protocols) to one or more terminal devices, one of which is identified as the terminal device 104.

It may be appreciated that other terminal devices may be configured in substantially the same manner as the terminal device 104, although this may not be required of all embodiments and different terminal devices can be configured differently and/or may exchange data or information with the upstream server 102 in a unique or device-specific manner.

The upstream server 102 can be any suitable electronic network device that is used to provide data services to terminal devices of a data transfer network. Example upstream servers 102 may include modem termination systems, gateways, routers, bridges, hubs, headend devices, distribution hub devices, or other devices that transact communications with terminal devices. The upstream server 102 may be communicably coupled with multiple terminal devices, other servers, internet service providers, broadband service providers, and the like.

The upstream server 102 can route data signals from a service provider, such as a headend in a broadband cable network, to the terminal device 104. The upstream server 102 may allocate signal resources between terminal devices coupled with the upstream server. The upstream server 102 may receive data signals from the terminal devices, process and route the data to other network components such as a headend, the internet, and so on.

In some cases, the upstream server 102 may receive messages or alerts from the terminal device such as an acknowledgment that indicates whether a data signal was received by the terminal device. In some instances, these messages may report issues in signal communications between the upstream server 102 and the terminal device 104.

For example, such as described herein, the terminal device 104 may alert the upstream server of disruptions such as noise, interference, distortions, and so on that are detected by the terminal device 104. The upstream server 102 may use this data to perform additional analysis or take actions to identify and correct disruption experienced by the terminal device 104.

In some cases, such as described herein, the network maintenance system 100 may include an analysis server 106 communicably coupled with the upstream server 102. The analysis server 106 may be configured to identify, detect, recognize patterns, localize, and diagnose signal disruption events occurring in a data transfer network. In some cases, the analysis server 106 may receive alerts, messages, or data associated with disruption events at one or more terminal devices. The analysis server 106 may be configured to perform issue identification, tracking, escalation, and cause analysis for disruption events that are detected by terminal devices on the network. For example, the upstream server 102 may be configured to offload disruption data that it receives to the analysis server 106, which keeps signal transfer resources free at the upstream server 102 for transferring data with the terminal devices. In some cases, the upstream server 102 may send all disruption data received from the terminal devices to the analysis server 106. In other cases, the upstream server 102 may send specific types of issues to the upstream servers, such as disturbance data that is identified as having a higher severity. In some embodiments, the analysis server 106 may be connected to multiple upstream servers (not shown) and collect data from all of these devices to monitor and analyze larger portions of the data transfer network (e.g., multiple nodes).

The analysis server 106 may be configured to determine whether a disruption event is localized to a specific terminal device, affects multiple terminal devices located on a common node, affects multiple nodes within a data transfer network, and so on. For example, the upstream server 102 may send disruption alerts from multiple different terminal devices to the analysis server 106, and the analysis server 106 may determine that the same type of disruption is occurring at each device. In this case, the analysis server 106 may determine that there is an issue with a common server that serves the terminal devices experiencing the disruption. In some examples, the analysis server 106 may generate a ticket for the common server to be inspected and/or repaired.

The terminal device 104 can be any suitable electronic network device, which may include a modem, routers, network switches, residential gateways, set top boxes, gateways, wireless routers, mobile devices such as handheld wireless mobile devices, laptop computers, desktop computers, industrial control devices, home or business or industrial automation devices, or the like.

The terminal device 104 may include a processor 108 and volatile and/or non-volatile memory 110 (hereinafter collectively referred to as memory 110). The processor 108 of the terminal device 104 can be configured to execute executable code stored, at least in part, in the memory 110 and/or accessible to the processor 108 via a communication channel.

The processor 108 may execute one of more functions to facilitate communications with the upstream server 102 to receive and transmit data to and from the terminal device 104. The processor 108 may be configured to facilitate communications with the upstream server 102 or other terminal devices via one or more wired or wireless communication protocols, which may include broadband communication such as data over cable service interface specification (DOCSIS), internet protocol (IP), local or wide area networking such as local wireless networking (e.g., WI-FI®), broadband cellular network (e.g., 4G LTE, 5G, or the like), and so on.

As noted above, the processor 108 may be configured to execute one or more network monitoring applications stored, at least in part, in the memory 110. In some embodiments, such as described herein, the processor 108 may determine signal quality metrics for data signals received at the terminal device 104. For example, the processor 108 may be configured to compute RxMER data for a frequency spectrum of data channels included in data signals received at the terminal device 104.

The RxMER data may serve as a proxy for real-time signal to noise ratio, and may indicate that noise or interference in data signals are reducing data throughput or otherwise disrupting communications between the upstream server 102 and the terminal device 104.

In some cases, such as described herein, the processor 108 may be configured to execute executable code that, in turn, causes the processor 108 and the memory 110 to instantiate an instance of a classification model stored in the memory 110. As noted above, the (instantiated) classification model can be configured to identify, among other properties, a type of interference or disturbance present in one or more data signals, across one or more bands, and so on. Example properties that can be identified by a classification model, and/or operations of a classification model, such as described herein can include identifying noise ingress, one or more standing waves, unexpected channel sweeping events, signal roll-off, signal roll-up, or the like.

In some examples, a classification model can be configured to identify a source of interference such as, but not limited to, noise ingress due to wireless signals (e.g., LTE signals), roll-off when a modem does not support received signals transmission protocol(s) (e.g., carrier frequency of received data signals is higher than supported by the terminal device hardware), or the like.

In further examples, a classification model can be configured to identify a cause of the identified interference. For example, the classification model may be configured to determine that signal ingress due to LTE signals is being caused by faulty shielding at the terminal device.

As a further example, the classification model may be configured to continuously analyze signal quality data (e.g., RxMER) determined by the terminal device 104. Such configurations may increase a likelihood that the terminal device 104 will detect transient events that may cause disruption. As one example, a classification model can be configured to identify that faulty grounding of an ancillary electrical device such as a garage door that is creating transient signal disruptions. The classification model can make such a determination by identifying 50-60 Hz interference in a tight band that occurs in a transient manner at approximately 7:30 am and at approximately 5:30 pm. In this example, the classification model can infer and/or predict that a motor-driven appliance that introduces 50-60 Hz noise twice (garage opens, garage closes) in rapid succession in the morning and twice in rapid succession in the evening, paired with a drop in network utilization midday (when a home is vacant), is the result of a poorly wired garage door.

It may be appreciated that, more generally and broadly, the network maintenance system 100 such as described herein can be configured to leverage, utilize, or employ any suitable pattern recognition or classification algorithm, probabilistic model, machine learning technique (whether trained or untrained), artificial intelligence method, or any suitable combination thereof, to detect, define, determine, or otherwise infer one or more patterns in and/or logical or casual relationships between, different data signal disturbances, successions or sequences of disturbances, or combined disturbances for different types of data transmissions.

The network maintenance system 100 may be configured to detect, define, determine, or otherwise infer one or more signal disturbances in, without limitation: cable broadband networks, wireless local area or wide area networks, mobile broadband networks such as LTE, telecommunications networks, and the like.

It may be appreciated, however, that the foregoing examples are not exhaustive and that any suitable means of determining or detecting disturbances in data transmissions can be used. For simplicity of description, these operations are described herein as operations to identify and classify disturbances in data signals transferred over cable broadband networks.

Figure 1B:
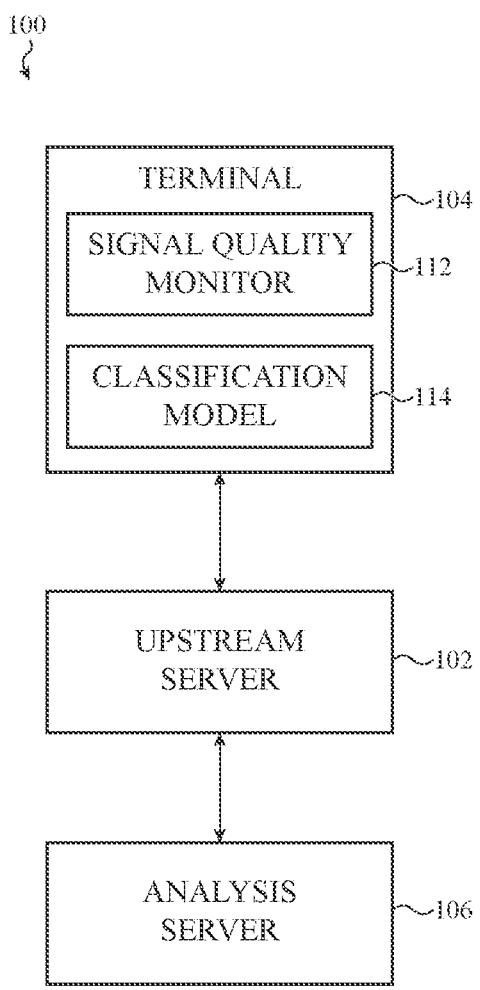
FIG. 1B depicts an example schematic representation of a network maintenance system, such as described herein.

FIG. 1B is a schematic representation of a network maintenance system 100. In the illustrated embodiment, the network maintenance system 100 is implemented with a data transfer network architecture including the upstream server 102 communicably coupled (e.g., via one or more networking or wired or wireless communication protocols) to one or more terminal devices, one of which is identified as the terminal device 104. The terminal device 104 may include one or more executable programs performing network maintenance functions, which can include a signal quality monitor 112, and a classification model 114 for analyzing signals received at the terminal device 104. The signal quality monitor 112 and the classification model 114 may be stored in the memory 110 and executable by processor 108 such as described herein.

The signal quality monitor 112 can be configured to determine, compute, and/or characterize one or more quality metrics of signals received at the terminal device 104, such as data signals received from the upstream server 102. This may include computing a received RxMER for one or more data channels of a received signal, spectrum capture, pre-equalization data, signal noise/interference, signal distortions, or the like.

The signal quality metrics may be stored at the memory 110 of the terminal device 104 and/or be provided as input to the classification model 114. Such as described herein, signal quality metrics determined by the signal quality monitor 112 may indicate that noise or other disruptions are present in received data signals. However, the signal quality metric may not indicate a type of disruption, source of the disruption, root cause, or the like. As such, it may be difficult for the network maintenance system 100 (e.g., analysis server 106) to determine a specific source or cause of the disruption at a terminal device or whether a disruption experienced by one terminal device is part of a larger issue, such as a problem with a server forming an intermediate node of the network.

In some cases, such as described herein, the classification model 114 is configured to perform additional analysis using one or more signal quality metrics determined by the signal quality monitor 112. This may include the processor 108 executing the classification model 114 using signal quality data (e.g., RxMER) to perform any suitable pattern recognition or classification algorithm, probabilistic model, machine learning technique (whether trained or untrained), artificial intelligence method, or any suitable combination thereof, to detect, define, determine, or otherwise infer one or more patterns in and/or logical or casual relationships between, different data signal disturbances, successions or sequences of disturbances, or combined disturbances for different types of data transmissions.

For example, the classification model 114 may include a trained machine learning algorithm that processes the signal quality data to identify a source of interference in data signals received at the terminal device 104. The classification model 114 can be configured to identify the type, source, and/or cause of the interference such as by outputting a label. Example labels may include: identifiers indicating a type of the disruption such as wireless noise ingress, signal roll-off, standing waves, channel sweeping, or the like; indicators associated with frequency characteristics of the interference such as identifying a center frequency, bandwidth, intensity, or the like; identifiers of one or more sources of the disruption such as wireless signal interference, unsupported signal frequencies, channel sweeping, or the like; identifiers indicating a source of the disruption such as faulty shielding, improper grounding, faulty or failing hardware, and so on.

In some embodiments, such as described herein, outputs (e.g., types, sources, and/or causes of identified disturbances) from the classification model 114 can be used to perform proactive network maintenance operations. For example, traditional network maintenance operations may include a terminal device logging signal quality data, and sending the signal quality data to an upstream device upon request, where the upstream device performs periodic/occasional analysis on the signal quality data in an attempt to discover disruptions in signal transmissions.

However, the described network maintenance system 100 can implement an advanced multi-level diagnostic method by performing signal diagnostic operations at edge devices (e.g., terminal device 104 executing classification model 114) and using the diagnostic data generated by edge devices (e.g., types, sources and/or causes of identified interference) at different system levels of a data transfer network for maintenance.

In some implementations, diagnostic data generated by terminal device 104 can be used to determine whether the identified disturbance(s) is limited to the terminal device 104 or is causing issues at other devices (e.g., other terminal devices and/or upstream devices) of the data transfer network. In some cases, each terminal device in a data transfer network may be configured to analyze signal quality data, for example by executing one or more classification models such as described herein.

The analyzing operation may be done continuously, at defined intervals, in response to defined signal quality thresholds or other operating parameters of a terminal device, in response to a request or command from another network device (e.g., terminal device and/or upstream device), or the like. The terminal device may be configured to send a message or alert to an upstream device in response to identifying a disturbance and/or a type, source, or cause of the identified disturbance.

The terminal device 104 may store data associated with the disturbance and wait for a response from the upstream server 102. Examples of disturbance data include, without limitation: type of the interference (e.g., noise ingress, roll-off, roll-up, standing waves, channel sweeping, or the like), source of the interference (e.g., wireless signal ingress, unsupported frequencies, or the like), cause of the interference (e.g., faulty shielding, faulty grounding, physical disruption, failing or failed hardware, and so on), frequency data associated with the type, source, or cause such as center frequency, bandwidth, or the like, indication of transient or ongoing disturbances, the received signal data and/or signal quality metrics determined from the received signals, indication of type of analyses performed (e.g., by the classification model 114), parameters used for the analysis, timing of the disturbance, severity, or other suitable parameters.

In some implementations, the terminal device 104 may send different types of messages or alerts to the upstream server 102. For example, the terminal device 104 may send a flag to the upstream server 102 that indicates a disturbance was detected, and that the terminal device 104 is storing data associated with the disturbance. In some cases, the flag may include a type, source, or cause of the interference, severity, timing, or other parameter included in the disturbance data.

In some implementations the terminal device 104 may include specific types of data based on one or more determined parameters of the disturbance data. For example, if the terminal device 104 determines that a severity of the identified disturbance satisfies a threshold (e.g., indicating imminent failure of the communication connection), the terminal device 104 may be configured to include all the determined/collected disturbance data in the message for analysis to the server. In cases where a determined severity of the identified disturbance is low (e.g., low impact transient event), the terminal device 104 may simply send a flag minimizing message size and wait for further instructions from the upstream server 102.

In some implementations, such as described herein, the terminal device 104, upon identifying interference, may send a request to one or more other terminal devices (e.g., on the same network node) to determine if these devices are experiencing similar issues.

For example, the terminal device 104 may send its disturbance data to the other terminal devices and request any disturbance data that these devices have collected. For example, a first terminal device may identify a first type of disturbance is data signals it has received from the upstream server 102, and send a message to a second terminal device that it is experiencing suck-out interference is a certain frequency band. The second terminal device may confirm (or perform additional analysis) whether it is experiencing similar or associated interference at signals it is receiving from the upstream server 102. Accordingly, the terminal devices may initiate communications with each other to gather data about whether a detected disturbance is isolated to a single device or is affecting a larger portion of the data transfer network. Communications between terminal devices may occur in-band or via other communications channels. For example, if the data connection between the terminal device 104 and the upstream server 102 has failed, the terminal device 104 may initiate a wireless local area connection or wide area connection with one or more nearby terminal devices to maintain communications with the data transfer network.

In some implementations, generally and broadly, one or more upstream servers such as upstream server 102 and/or analysis server 106 may use disturbance data received from one or more terminal devices to identify, localize, determine a cause of, and/or initiate protective steps to address the detected disturbances.

For example, if the analysis server 106 only receives a flag—which may include disturbance data—from the terminal device 104, the analysis server may determine that the identified disturbance is isolated to the terminal device 104 and generate a ticket or take other action (e.g., virtual trouble shooting) for servicing the terminal device 104.

In other cases, the analysis server 106 may receive multiple flags from respective different terminal devices and compare them to the received flags and associated disturbance data. In some cases, the analysis server 106 may be configured to perform any suitable pattern recognition or classification algorithm, probabilistic model, machine learning technique (whether trained or untrained), artificial intelligence method, or any suitable combination thereof, to detect, define, determine, or otherwise infer one or more patterns in and/or logical or casual relationships between disturbance data received from different terminal devices.

As one example, the analysis server 106 may localize an issue causing the disturbances to a first node of the data transfer network based on recognizing that all terminal devices reporting issues are located on the same node. In some cases, the analysis server 106 may conclude that there is an issue with a modem termination system serving the terminal devices.

In some implementations, such as described herein, the analysis server 106 may receive a flag from one or more terminal devices and send a request to the terminal device for additional disturbance data collected and/or determined by these devices. For example, the analysis server 106 may receive flags from multiple terminal devices located on a same network node, and each flag may indicate that the disturbances are associated with wireless noise ingress.

The analysis server 106 may request that the terminal devices send the received spectrum signals and perform additional analysis to determine a source of the wireless noise, such as LTE ingress. In some examples, the analysis server 106 may send a request for each of the terminal devices to perform additional analysis in response to receiving the flag. For example, the analysis server 106 may virtually activate additional classification models stored on a terminal device, update one or more parameters associated with a current classification model, and/or send a new or different classification model to one or more of the terminal devices for additional analysis.

Such processes may increase network efficiency (e.g., decrease network resource use for maintenance) by having each edge device perform analysis on its received signals/detected disturbances, which may reduce the amount of disturbance data sent to the analysis server and distribute the computational load over the edge (e.g., terminal devices) instead of concentrating it at the analysis server 106.

Generally and broadly, FIGS. 2-5 depict system and signal flow diagrams and example signal processing of data signals received at a terminal device, such as described herein, to identify and detect disturbances in signals transmitted using a data transfer network.

Figure 2:
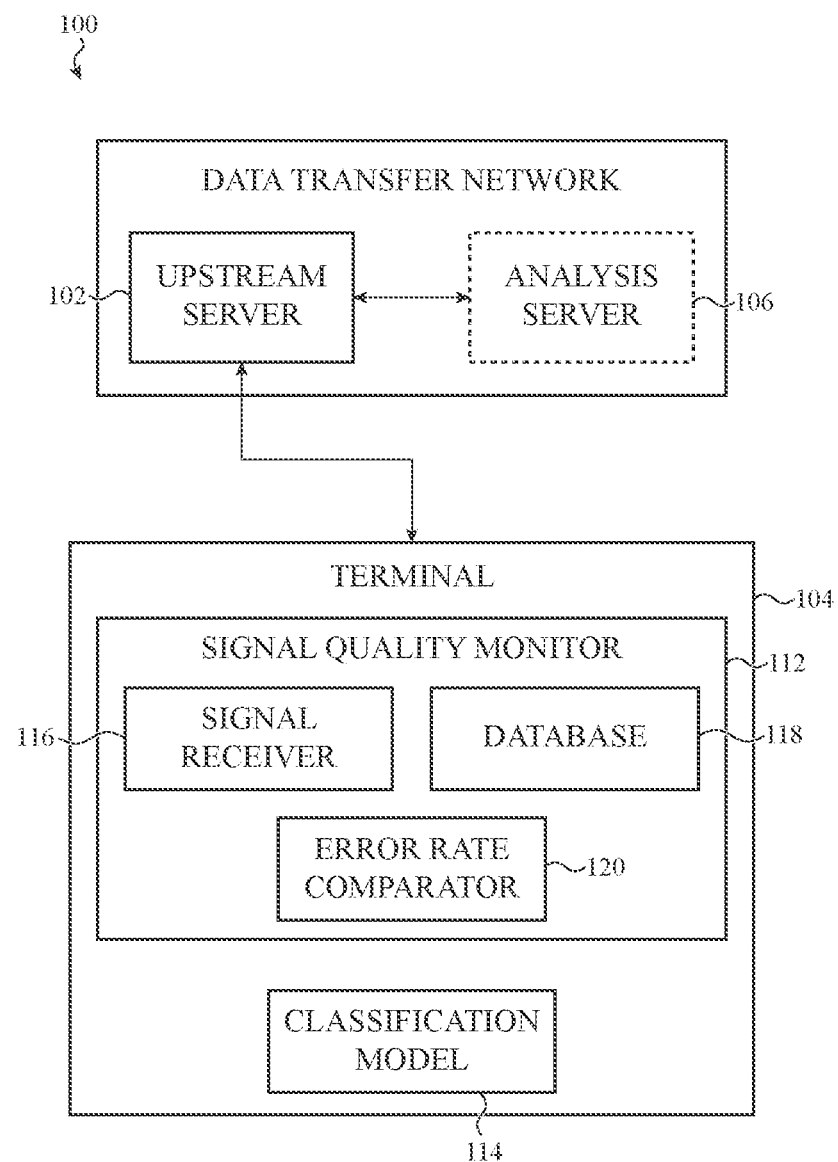
FIG. 2 depicts an example system and signal flow diagram of a network maintenance system, such as described herein.

FIG. 2 illustrates a system and signal flow diagram of the network maintenance system 100. For simplicity, the system and signal flow diagram of the network maintenance system 100 is described in the context of a broadband cable network, which is illustrated to provide examples of the underlying concepts, systems, and methods, which can be applied to other data transfer networks, which may include without limitation, telecommunications networks, wired or wireless local area or wide area networks, mobile broadband networks, packet switched networks such as those operating using IP addressing, and the like. In the illustrated embodiment, the signal quality monitor 112, such as described herein, can include a signal receiver 116, a database 118, and an error rate comparator 120, which may be executed on the processor 108, and stored, at least in part, on memory 110 of the terminal device 104.

Generally and broadly, the signal quality monitor 112 may input data transmission signals received from the upstream server 102 and perform one or more signal processing techniques, computations, analysis, or algorithms to determine one or more signal quality metrics for the received signals.

The terminal device 104 may receive data signals from the upstream server 102 via one or more communication protocols. These may include broadband communication protocols, mobile broadband communication protocols, wireless networking protocols, packet switching protocols, or the like. The data signals may be transmitted over a range of frequencies and be modulated using different techniques known in the art. The signals may be divided into different bands or channels each of which may include subcarriers for transacting data between the upstream server 102 and the terminal device 104.

In some cases, the network maintenance system 100 may perform operations that characterize signal quality between the upstream server 102 and the terminal device 104. The signal receiver 116 may receive a spectrum of frequency data such as modulated data signals that is transmitted by the upstream server 102. In some implementations the signals received by the signal receiver 116 may include pilot signals transmitted by the upstream server 102, which may include predefined or known data.

The signal receiver 116 may receive the pilot signals and determine a signal quality metric based on comparing an expected signal spectrum (e.g., predefined signal) with the signal spectrum that was detected by the signal receiver 116 of the terminal device 104. The signal receiver 116 may store the received data in the database 118. In some cases, the signal receiver 116 may cache the received pilot signals for a period of time, for example, while one or more analyses are performed by the classification model 114. If the pilot signals satisfy one or more criteria, such as the classification not detecting any disturbances, then the pilot signals may be deleted, overwritten or otherwise removed from the database. In other cases, such as if the classification model detects or identifies interference, the received pilot signals may be stored for further analysis.

In some embodiments, the error rate comparator 120 may retrieve pilot signals from the database 118 or the signal receiver 116 and compute one or more signal quality metrics using the pilot signals. In some implementations, the error rate comparator 120 is configured to compute RxMER for signals received from the upstream servers 102, which may be determined by taking the ratio of the average symbol power to average error power for subcarriers in data channels of the transmitted pilot signals.

In some cases, the error rate comparator 120 may store or cache the computed signal quality metrics (e.g., RxMER) in the database 118. The classification model 114 may receive the signal quality metrics and perform one or more processes on the signal quality metric data to identify types of interference affecting the data signals received at the terminal device 104, such as described herein.

Figure 3A:
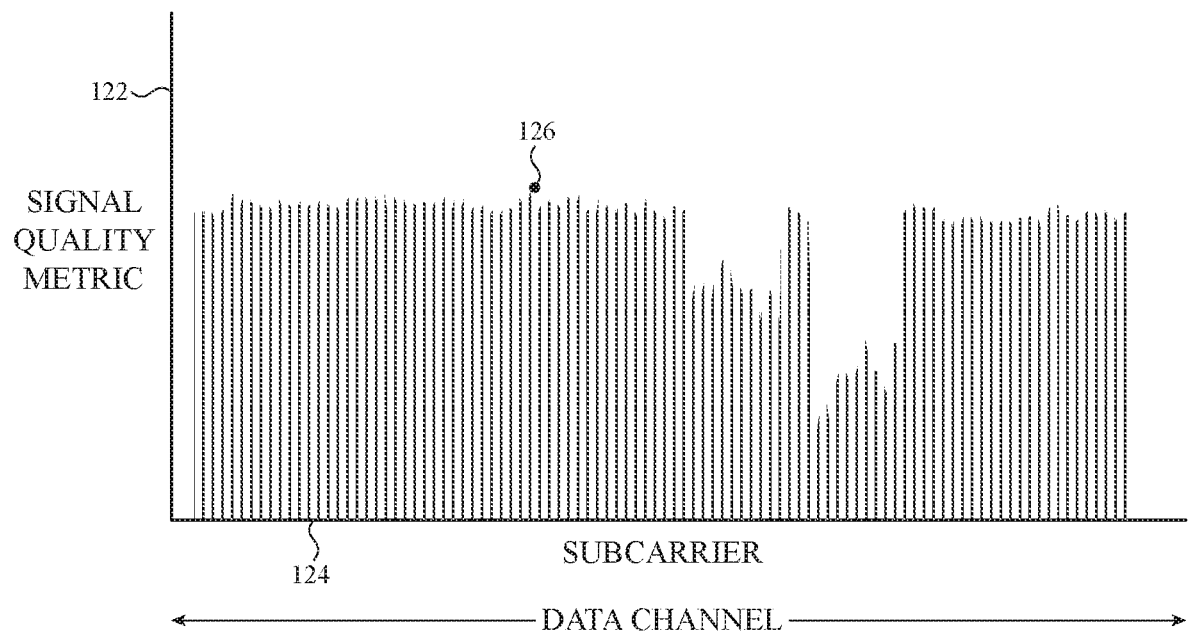
FIG. 3A depicts an example of signal quality data for signals received by a terminal device of a data transfer network, such as described herein.

FIG. 3A illustrates an example of computed signal quality metrics determined for a frequency spectrum of data signals in a channel that are received by the terminal device 104 of a data transfer network. In the illustrated embodiment, the signal quality metric 122 is represented by the vertical axis—RxMER is illustrated as an example signal quality metric—and the subcarriers 124 of a data channel (plotted as a function of frequency) are represented on the horizontal axis. For simplicity of illustration RxMER metrics for subcarriers in a single data channel are shown, however the described processes, methods, and systems can be applied to more than one channel, such as all channels that are used to transmit data over a given network structure and protocol.

In some implementations, such as the broadband cable network provided by way of example, RxMER may be calculated for each subcarrier frequency in received signal spectrum. For simplicity of illustration, a first RxMER metric 126 is illustrated. In some cases, the error rate comparator 120 may generate an array of RxMER metrics in which each metric may correspond to a respective subcarrier of the data channel. The error rate comparator 120 may store or cache the array of RxMER metrics in the database 118, which may be provided to, or retrieved by, the classification model 114 to identify and/or classify disturbances in received data signals.

In some cases, the error rate comparator 120, the classification model 114, or other programs stored in memory 110 and executable by the processor 108 may perform signal processing operations on the RxMER data prior to the RxMER data being input to the classification model 114. For example, to increase the processing speed of RxMER data by the classification model 114, the array of RxMER data may be down-sampled to decrease the size of the RxMER data.

Figure 3B:
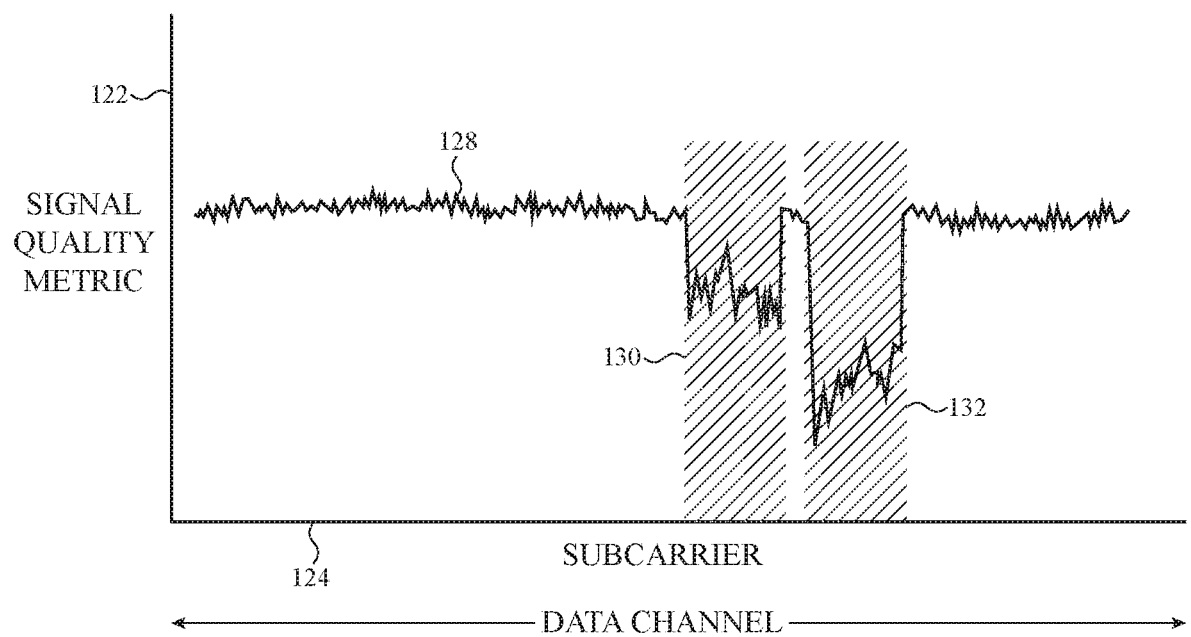
FIG. 3B depicts an example of a data analysis operation that may be performed on signal quality data collected by a terminal device in a data transfer network, such as described herein.

FIG. 3B illustrates an example of data analysis that may be performed on signal quality data of a terminal device in a data transfer network. For simplicity of illustration, processes, methods, and systems for down-sampling of RxMER data is shown and described in the illustrated embodiment, but the processes, methods, and systems may be performed on other signal quality metric data including, without limitation, spectrum capture data, signal to noise ratio data, pre-equalization data, and so on.

In some embodiments, such as described herein, down-sampling of computed RxMER data may be performed to capture anomaly details in the array data that are associated with disturbances such as noise/interference. In some examples, the down-sampling processes may be configured to preserve high frequency anomalies, signal values spikes, signal quality minimums and/or maxims, and the like. In some embodiments, the array of RxMER values may first be up-sampled using nearest neighbor interpolation techniques.

The interpolated array of RxMER metrics 128 are shown as a solid line in for purposes of illustration. The interpolated RxMER metrics 128 may then be down-sampled by dividing the interpolated RxMER metrics 128 into bins having a defined width (e.g., each bin contains 5 consecutive RxMER metric values) and taking the minimum value in each bin to generate the down-sampled array of RxMER metrics.

In some embodiments, such as described herein, the down-sampled RxMER metrics may be provided to, or retrieved by, the classification model 114. The classification model 114 may process the data, such as described herein, and identify and/or classify one or more disturbances in received data signals using the down-sampled array of RxMER data. For simplicity of illustration, a first disturbance 130 and a second disturbance 132 are illustrated, however such as described herein the described processes, methods, and systems can be used to identify, classify, and/or determine a cause of any trained disturbance.

In some embodiments, the classification model 114 may be configured/trained to identify the first disturbance 130 as signal ingress noise. In these cases, the classification model 114 may output a label indicating that signal ingress noise was detected. The label may indicate a center frequency of the first disturbance, bandwidth of the first disturbance, or other suitable metrics such as minimum, maximum, and/or other RxMER value for the first disturbance. Additionally or alternatively, the classification model 114 may be configured to classify a source of the identified disturbance.

For example, the classification may be configured/trained to classify the first disturbance 130 as a wireless signal ingress such as LTE ingress, and output a label indicating that the first disturbance 130 is associated with wireless signal ingress. In further embodiments, the classification model 114 may be configured/trained to output a cause of the first disturbance. For example, the classification model 114 may determine that the cause of the wireless signal ingress and/or signal ingress is due to faulty shielding at the terminal device 104. In some cases, the terminal device 104 may include multiple classification models, each configured to provide a different output.

In some embodiments, identifying, classifying, and/or determining a root cause for the first or second detected interference may be partially based on or refined by analyses performed at one or more upstream servers such as upstream server 102 and/or analysis server 106. These processes may include incorporating disturbance data received from other terminal devices on the data transfer network such as described herein.

Figure 4:
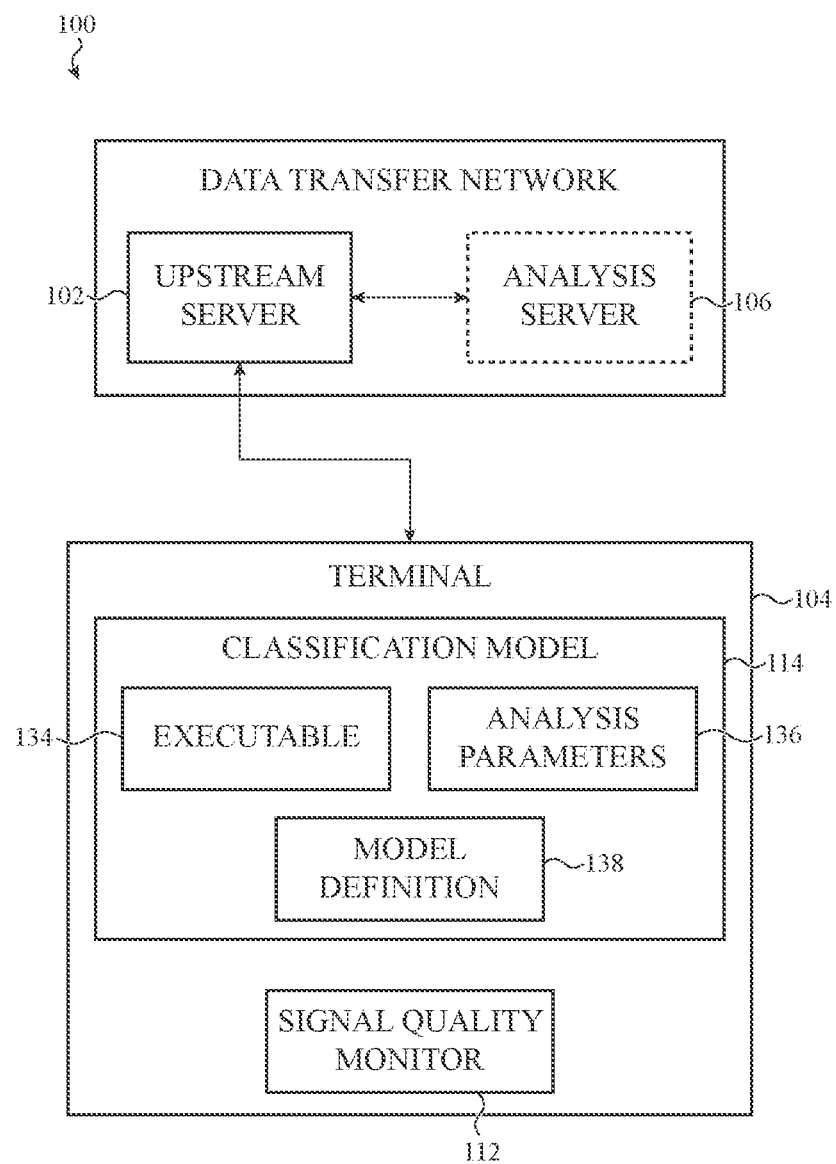
FIG. 4 depicts an example system and signal flow diagram of a network maintenance system, such as described herein.

FIG. 4 is a system and signal flow diagram of a network maintenance system 100. For simplicity, the system and signal flow diagram of the network maintenance system 100 is described in the context of a broadband cable network, which is illustrated to provide examples of the underlying concepts, systems, and methods, which can be applied to other data transfer networks, which may include without limitation, telecommunications networks, wired or wireless local area or wide area networks, mobile broadband networks, packet switched networks such as those operating using IP addressing, and the like. In the illustrated embodiment, the signal quality monitor 112, such as described herein, can include an executable program 134 that references analysis parameters 136, and a model definition 138, to run on processor 108, of the terminal device 104.

Generally and broadly, the classification model 114 can receive an array of signal quality metrics (e.g., RxMER), and output a label and/or other disturbance data associated with an identified signal disturbance such as described herein. In some embodiments, the classification model 114 may be configured to perform any suitable pattern recognition or classification algorithm, probabilistic model, machine learning technique (trained or untrained), artificial intelligence method, or any suitable combination thereof, to detect, define, determine, or otherwise infer one or more patterns in and/or logical or casual relationships from signal quality metrics determined by the terminal device 104.

For simplicity, processes, methods, and systems for implementing the classification model 114 are shown and described in the context of a convolutional neural network.

However, such as described herein, the processes methods, and systems described in the context of convolutional neural networks is provided as one example and these techniques and concepts can be readily applied to any other suitable analysis methods.

In some embodiments, such as described herein, the classification model 114 can include a neural network configured to be executed by the processor 108 of the terminal device 104. The neural network may be configured to continuously analyze quality metrics that are generated from received data signals. For example, the neural network may be configured to have a number of layers, filters, or other trainable parameters that can run on processor 108 of the terminal device 104.

In some embodiments, such as described herein, the neural network may include the executable program 134, the analysis parameters 136, and the model definition 138 stored as discrete files on the memory 110. The analysis parameters 136 and/or model definition 138 may individually or collectively form a parameter model that is processed by the executable program. For example, the executable program 134 may include the compiled program code for performing the convolutional neural network analysis that references the parameter model, which may include the analysis parameters 136, and/or the model definition 138.

The analysis parameters 136 may include the dimensions of the neural network (e.g., number of dimensional layers), types of layers or characteristics of the layers, a number of filters in each of the layers, the types of filters, and so on. The model definition 138 may include the trained data for configuring the neural network such as weights for the intermediate nodes, or other trained or learned data for configuring a response of the neural network to the inputted signal quality metrics.

In some embodiments, such as described herein, the executable program 134, the analysis parameters 136, and/or the model definition 138 may be updated independently or in coordination. For example, the terminal device 104 may include an initial neural network configuration, which may include first executable analysis parameters and model definition. As the terminal device 104 (and/or other terminal devices) collect and analyze signal quality metrics, the initial neural network may be updated, for example off-line, or at one or more upstream servers of the data transfer network. That is, the initial neural network may be refined to produce an updated neural network configuration based on the operation of the data transfer network. In this regard, the updated neural network may incorporate or be trained to identify issues and perform signal analysis that is tailored to the configuration of a specific data transfer network. Accordingly, the initial neural network configuration—the executable program 134, the analysis parameters 136, or the model definition 138, or a combination thereof—may be reconfigured with the updated neural network configuration.

In some embodiments, the classification model 114 may include multiple different neural networks of varying complexity and/or detection ability. For example, a first neural network may be configured for analysis speed, such that it can continuously process quality metric data, and perform a "rough" or higher-level analysis to identify signal quality metric data that warrants further analysis.

In such cases, the classification model 114 may be configured with a second neural network (or other suitable analysis technique) that can be implemented by the processor 108 to analyze signal quality metric data identified that was flagged for further analysis by the first neural network. Additional or alternatively, additional analysis can be performed at one or more upstream servers, such as described herein, each of which may execute neural networks or other suitable analysis techniques.

In other embodiments, one or more neural networks stored on the terminal device 104 may be virtually activated or deactivated, for example by an upstream device of the data transfer network. Virtually activating or deactivating different neural networks (or the executable program 134, the analysis parameters 136, or the model definition 138, or combination thereof) can be performed manually or automatically by the data transfer network, for example, in response to one or more sensed or determined conditions (e.g., model output, signal throughput, noise, interference, type of interference identified by one or more terminal devices, and so on).

Figure 5:
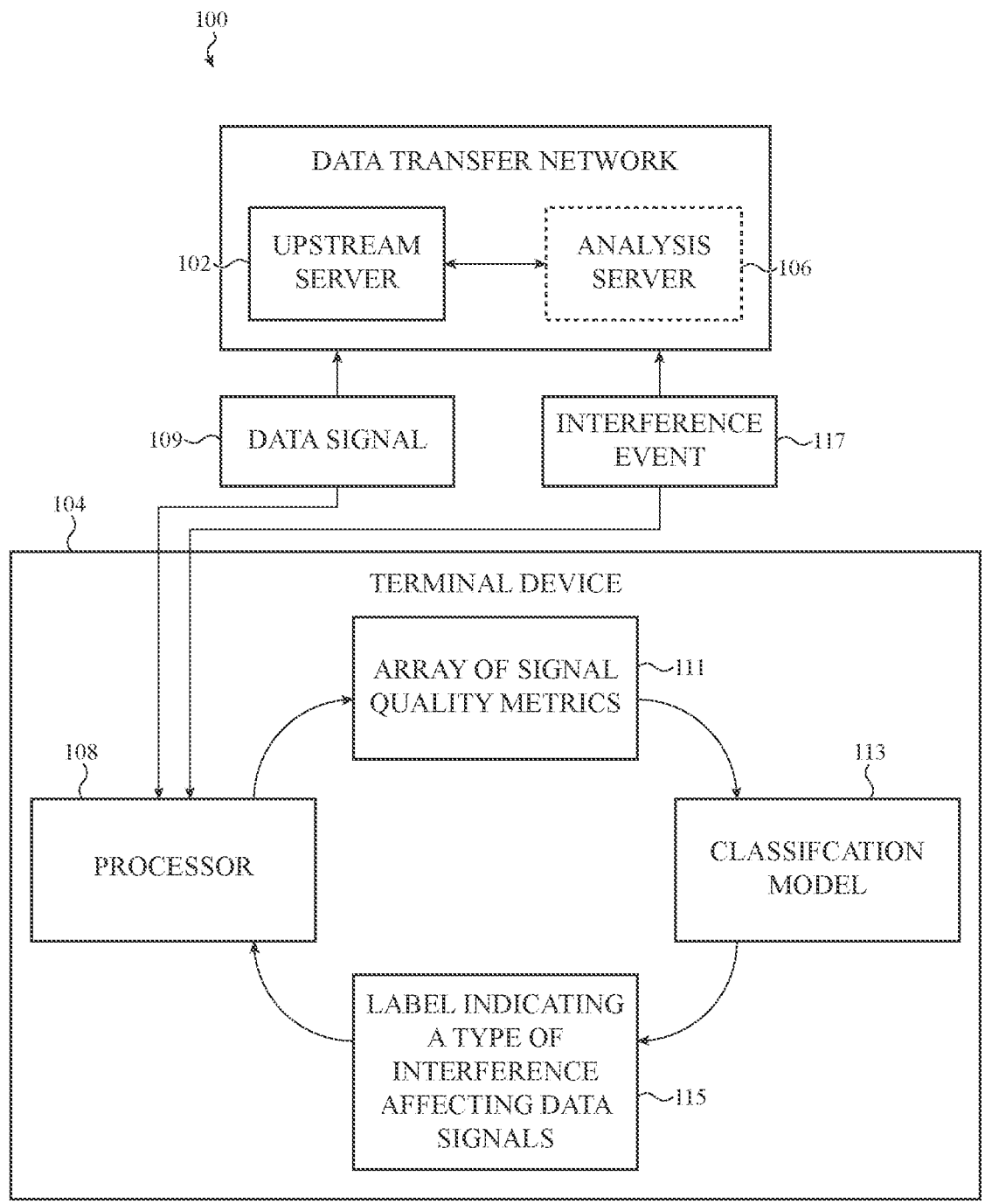
FIG. 5 depicts an example signal flow diagram of a network maintenance system, such as described herein.

FIG. 5 illustrates a system and signal flow diagram of a network maintenance system 100, such as described herein. Generally and broadly, FIG. 5 illustrates an example signal flow between an upstream server 102, a terminal device 104, and an analysis server 106 for receiving and analyzing data signals transmitted from the upstream server 102 and to the terminal device 104.

In some embodiments, such as described herein, the upstream server 102 may transmit a data signal 109 to the terminal device using a data transfer network. For simplicity of explanation, data transmission using a cable broadband network are discussed, however, the concepts, system, and processor discussed can be applied to any suitable data transfer network, which may include wired or wireless local area or wide area networks, mobile broadband networks, telecommunications networks, packet switched networks, and so on. The data signal 109 may be modulated using techniques known in the art, and carry payload data for the terminal device 104.

The terminal device 104 may receive the data signal 109 and the processor 108 can perform one or more operations to evaluate the signal quality of the received data signal 109. In some cases, this may include computing or determining one or more signal quality metrics such as described herein. For example, the processor 108 may determine an array of signal quality metrics 111 that characterize the received signal quality across the frequency spectrum used to transmit the data signal 109. In some embodiments, the array of signal quality metrics 111 may include a quality metrics associated with each subcarrier in one or more data channels used to transmit the data signal. The array of signal quality metrics 111 may be used to determine specific frequencies or ranges of frequencies that are affected by network disturbances such as interference.

In some embodiments, such as described herein, the array of signal quality metrics 111 may be provided, retrieved by, or otherwise inputted into a classification model 113 executed by the processor 108. The classification model 113 can be configured to perform additional or advanced analysis on the array of signal quality metrics 111 to identify or determine a type, source, or cause of disruptions in the data signal 109. For example, the classification model 113 may perform spectral analysis to elicit trends, patterns, anomalies, signal responses, or the like present within specific frequencies of the data signal. Accordingly, the classification model 113 may be configured to output data that identifies or determines specific frequency/frequencies, range of frequencies, or other frequency dependent data associated with identified disturbances.

In some embodiments, such as described herein, the classification model 113 may be configured to output a label 115 indicating a type, source, or cause of disturbances affecting the data signal 109. For example, the label 115 may indicate that the disturbance type is ingress noise at specific frequency bands in the received data signal. In some cases, the label 115 may indicate that the source of the noise ingress is due to a wireless signal operating in a mobile broadband frequency band (e.g., LTE band). Additionally or alternatively, the label 115 may indicate a cause of the interference such as wireless noise ingress due to faulty shielding in a hardware component used to transmit the data signal 109.

The processor 108 may receive the label 115 as an output from the classification model 113 and take steps to inform the upstream server 102 and/or analysis server 106 of the identified disturbance, such as described herein. For example, the processor may send a message or alert to the upstream server 102 indicating that an interference event 117 was detected. The upstream server 102 may take one or more actions in response to receiving the indication of the interference event 117, such as described herein.

Generally and broadly, FIGS. 6A-6F depict examples of different network disruptions that can be identified and classified by the network maintenance system 100.

FIGS. 6A-6F illustrate examples of arrays of signal quality metrics 140 for data signals received by the terminal device 104. In the illustrated embodiment, the signal quality metrics 142 are represented by the vertical axis—RxMER is illustrated as an example signal quality metric—and the subcarriers 144 of a data channel (plotted as a function of frequency) are represented on the horizontal axis. For simplicity of illustration, RxMER metrics for subcarriers in a single data channel are shown, however the described processes, methods, and systems can be applied to more than one channel, such as all channels that are used to transmit data over a given network structure and protocol.

Figure 6A:
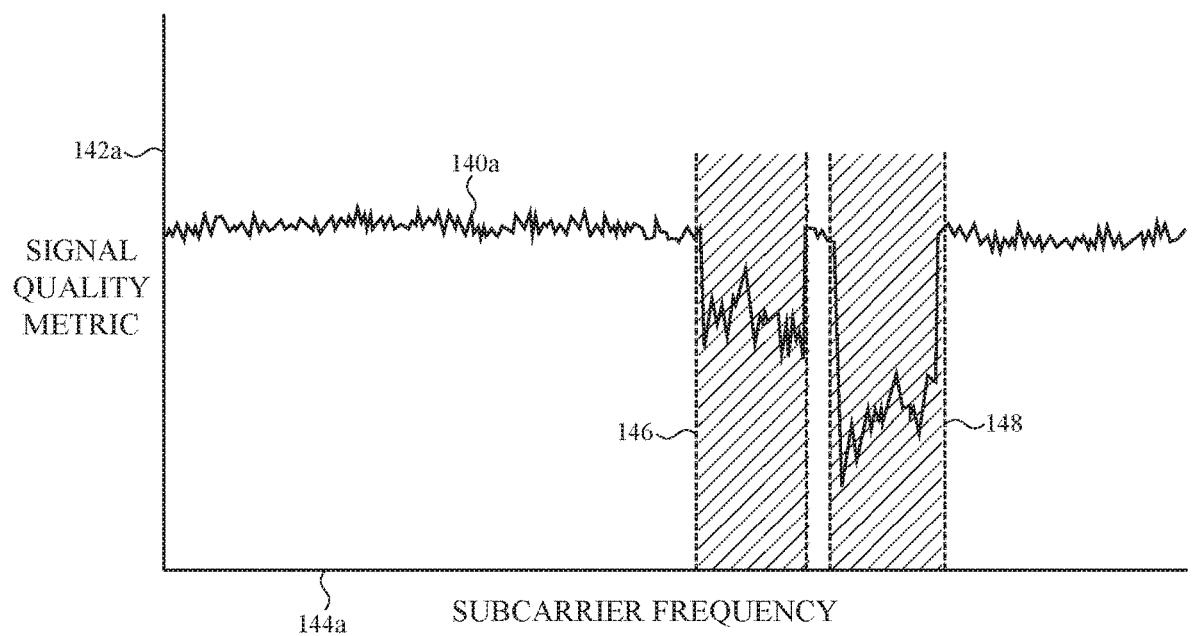
FIG. 6A depicts an example of a network disruption identified by a terminal device of a network maintenance system, such as described herein.

FIG. 6A illustrates an example of a signal disruption in the array of signal quality metrics 140a that was identified by the terminal device 104 of a network maintenance system 100. In the illustrated embodiment, the signal disruption includes a first anomaly 146 and a second anomaly 148. The terminal device 104 may input the array of signal quality metrics 140a into the classification model 114, and the classification model 114 may output a type, source, and/or cause of the disruption, such as described herein.

As one example, for the first anomaly 146, the classification model 114 may be configured to output a type of disruption as a noise ingress, a source of the disruption as a wireless signal ingress, a cause of the disruption as faulty shielding, or a combination thereof. In some cases, the classification model 114 may be configured or trained, such as described herein, to determine the source or cause of the disruption based on one of more frequency characteristics of the array of signal quality metrics, such as a location of the disruption within the RF spectrum. For example, the classification model 114 may be configured to identify the first anomaly 146 and/or the second anomaly 148 as single ingress noise within the LTE band. This is just one example, and the classification model can be configured to identify disruptions across the entire frequency spectrum.

Figure 6B:
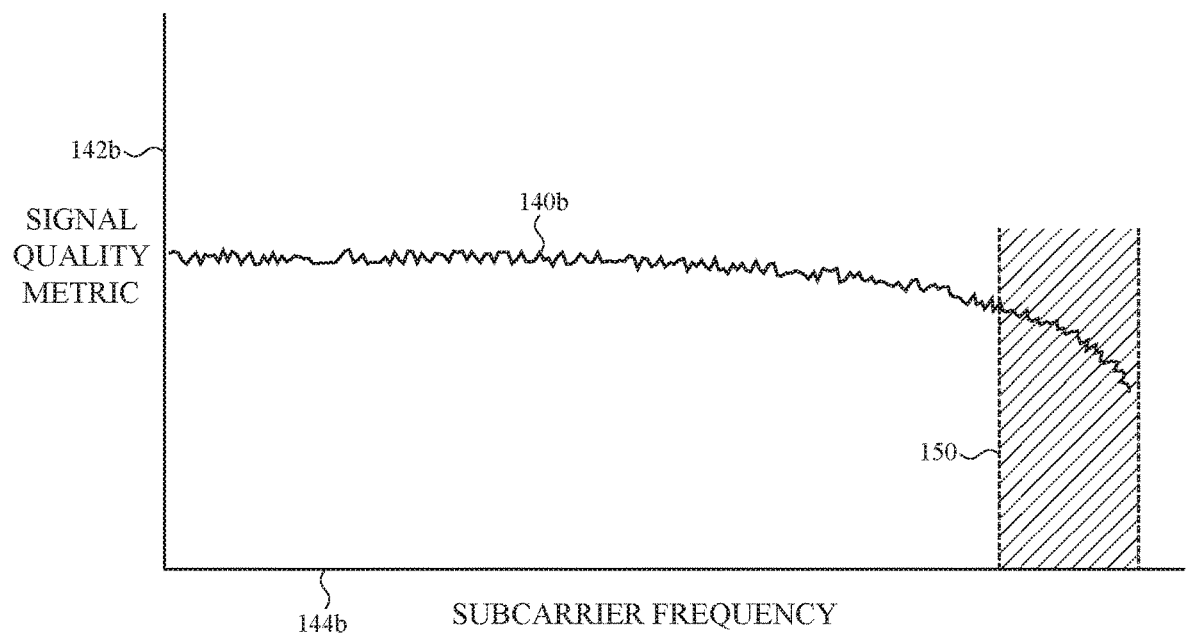
FIG. 6B depicts an example of another network disruption identified by a terminal device of a network maintenance system, such as described herein.

FIG. 6B illustrates another example of a signal disruption in the array of signal quality metrics 140b that was identified by the terminal device 104 of a network maintenance system 100. In the illustrated embodiment, the signal disruption includes a third anomaly 150, which is one example of a roll-off disruption that may occur, for example, due to the terminal device 104 receiving signals in portions of the frequency spectrum that are not supported by hardware of the terminal device (e.g., received signal frequency is higher than what is supported by the terminal device 104).

Figure 6C:
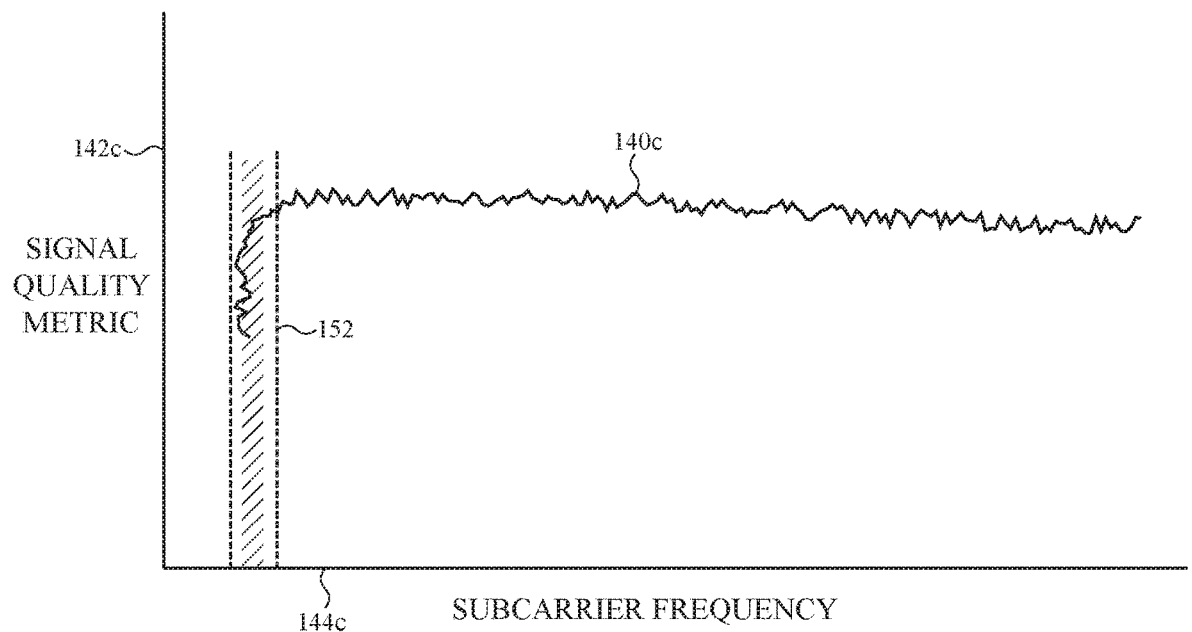
FIG. 6C depicts an example of another network disruption identified by a terminal device of a network maintenance system, such as described herein.

FIG. 6C illustrates another example of a signal disruption in the array of signal quality metrics 140c that was identified by the terminal device 104 of a network maintenance system 100. In the illustrated embodiment, the signal disruption includes a fourth anomaly 152, which is one example of a roll-up disruption that may occur in signals received at the terminal device 104.

Figure 6D:
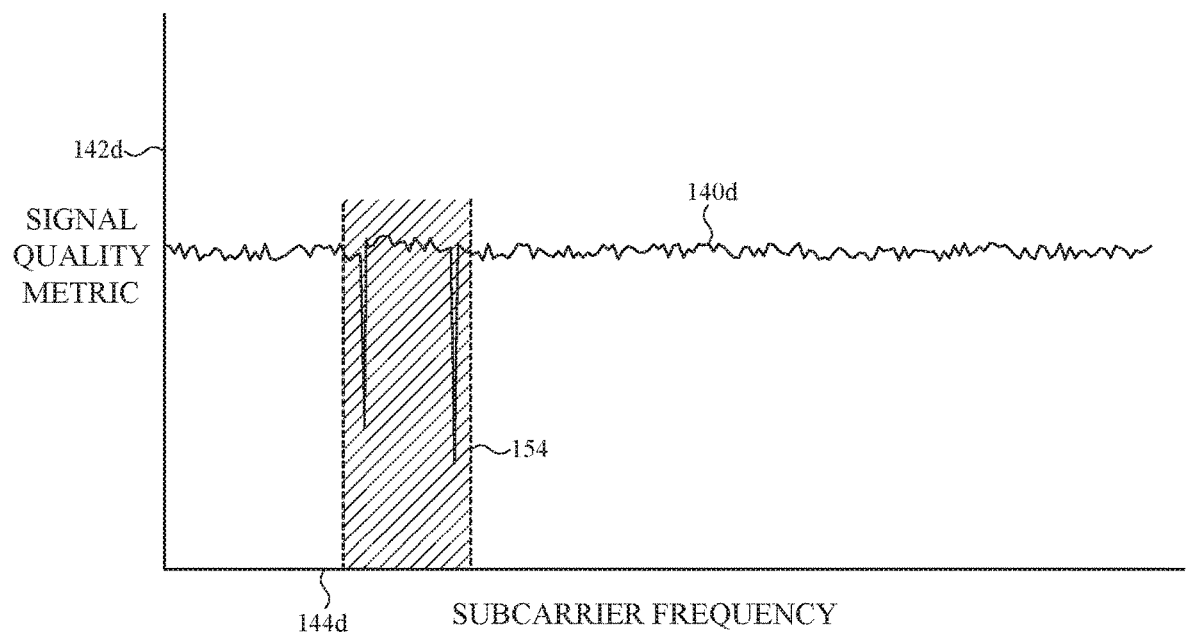
FIG. 6D depicts an example of another network disruption identified by a terminal device of a network maintenance system, such as described herein.

FIG. 6D illustrates another example of a signal disruption in the array of signal quality metrics 140d that was identified by the terminal device 104 of a network maintenance system 100. In the illustrated embodiment, the signal disruption includes a fifth anomaly 154, which is one example of unexpected signal sweeping that may occur at signals received at the terminal device 104.

Figure 6E:
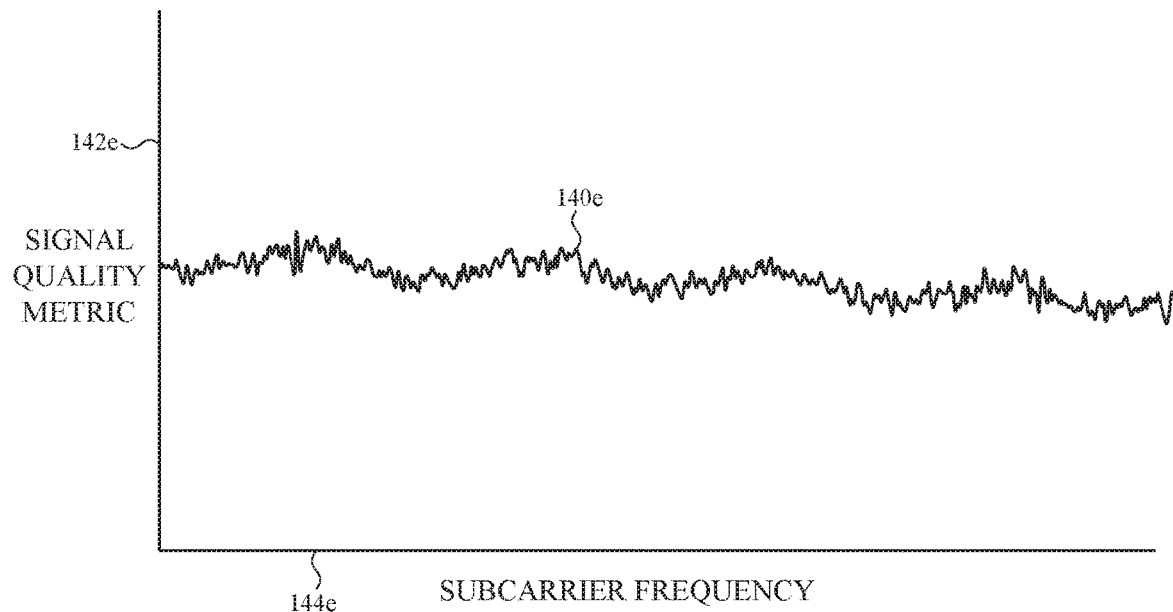
FIG. 6E depicts an example of another network disruption identified by a terminal device of a network maintenance system, such as described herein.

FIG. 6E illustrates another example of a signal disruption in the array of signal quality metrics 140e that was identified by the terminal device 104 of the network maintenance system 100. In the illustrated embodiment, the signal disruption includes a sixth anomaly, which is one example of a standing wave signal that may occur in signals received at the terminal device 104

Figure 6F:
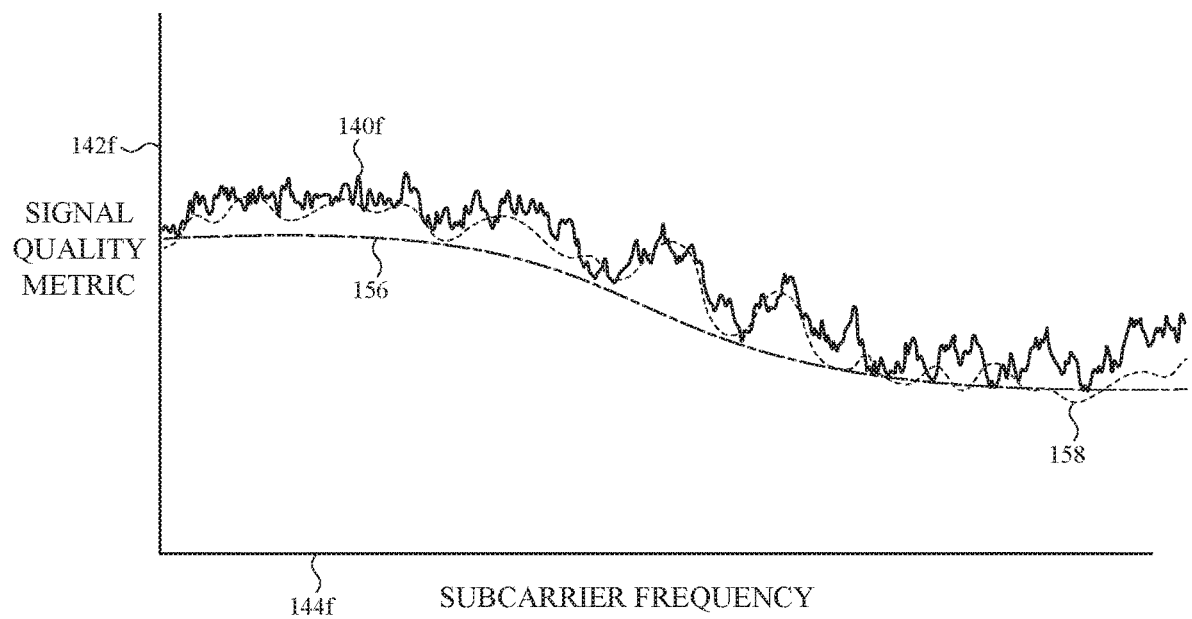
FIG. 6F depicts an example of another network disruption identified by a terminal device of a network maintenance system, such as described herein.

FIG. 6F illustrates another example of a signal disruption in the array of signal quality metrics 140f that was identified by the terminal device 104 of the network maintenance system 100. In the illustrated embodiment, the signal disruption includes a seventh anomaly 156 and eighth anomaly 158, which are examples of a first lower frequency standing wave and a second higher frequency standing wave that may occur at signals received at the terminal device.

Generally and broadly, FIGS. 7-14 depict flow charts corresponding to example simplified methods of operating a system, such as described herein, to identify and/or classify disruptions in signals received at a terminal device of a data transfer network.

Figure 7:
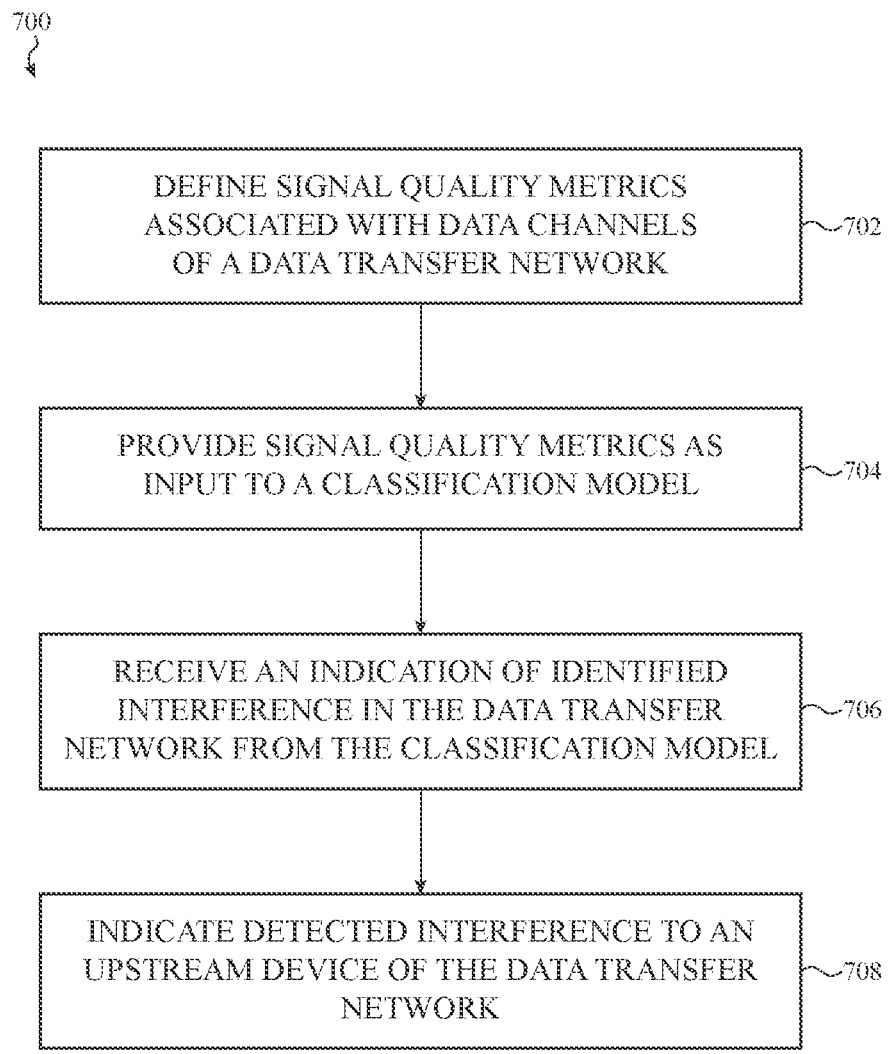
FIG. 7 is a flow chart that depicts example operations of a process of identifying and classifying interference at a terminal device of a data transfer network, such as described herein.

FIG. 7 is a flow chart that depicts example operations of a process 700 of identifying and classifying interference at a device of a data transfer network. The process 700 may be implemented using the processes and/or methods such as described herein. At 702, a terminal device may define an array of signal quality metrics that are associated with data channels of a data transfer network. The array of signal quality data may be defined across the frequency spectrum of signals received at the terminal device such that each signal quality metric in the array corresponds to a subcarrier in a data channel of the received signals.

At 704, the terminal device may provide the array of signal quality metrics as input to a classification model that is executed by the terminal device. In some embodiments, the signal quality metrics may include RxMER metrics computed for the frequency spectrum of signals received at the terminal device. In some embodiments, the signal quality metrics can include signal to noise ratios, spectrum capture data, and pre-equalization or other suitable metrics used to evaluate the quality of signals received at the terminal device. The classification model may identify and classify interference in the signal, such as described herein.

At 706, a processor of the terminal device may receive an indication of an identified interference in the signals received from an upstream device of the data transfer network as an output from the classification model. In some cases, the indication may include a label identifying a type, source, or cause of the interference. Additionally the indication may include frequency data associated with the interference such as a bandwidth, center point, intensity, or the like.

At 708, the terminal device may indicate a detected interference to an upstream device of the data transfer network. In some cases, this may include transmitting a message to the upstream device that an interference was detected and waiting for a response from the upstream device. In other cases, the terminal device may identify a type, source, or cause of the interference in the message. Additionally or alternatively, the terminal device may indicate a severity of the interference.

Figure 8:
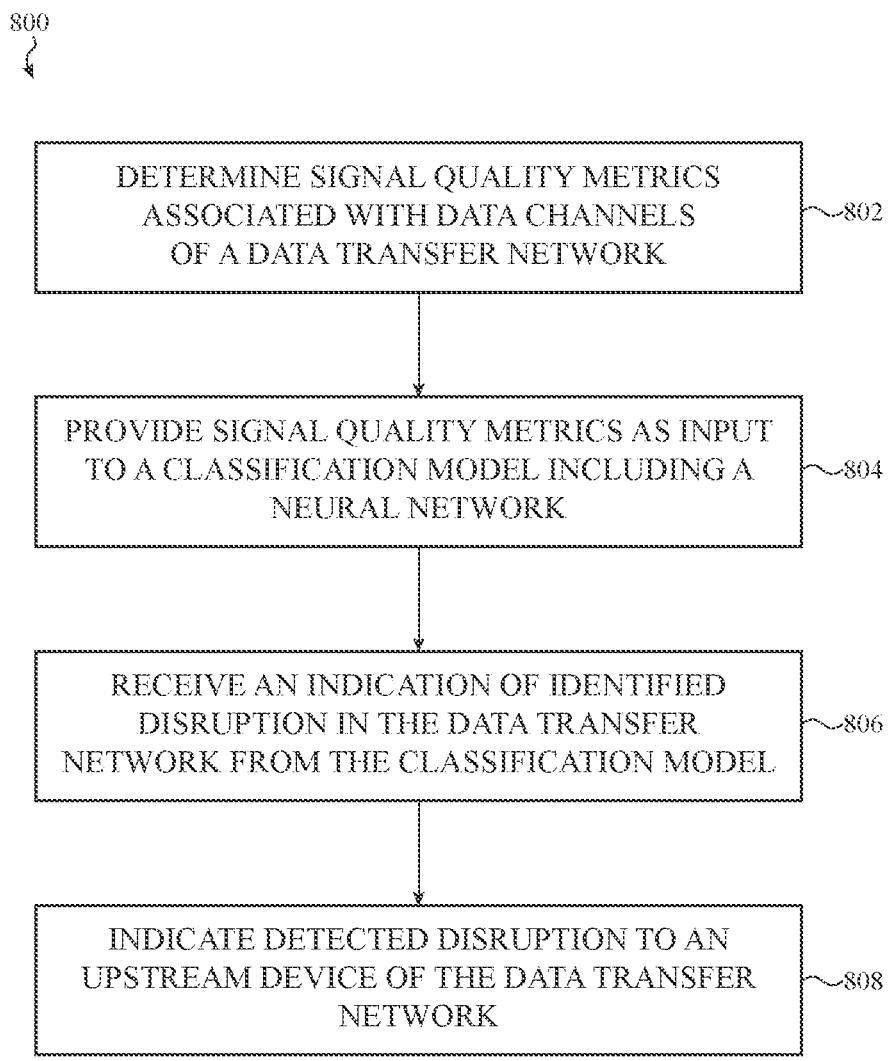
FIG. 8 is a flow chart that depicts example operations of a process of identifying and classifying disruptions at a terminal device of a data transfer network, such as described herein.

FIG. 8 is a flow chart that depicts example operations of a process 800 of identifying and classifying disruptions at a device of a data transfer network. The process 800 may be implemented using the processes, and methods such as described herein. At 802, a terminal device may determine an array of signal quality metrics that are associated with data channels of a data transfer network. The array of signal quality metrics may be defined across the frequency spectrum of signals received at the terminal device such that each signal quality metric in the array corresponds to a subcarrier in a data channel of the received signals.

At 804, the terminal device may provide signal quality metrics as input to a classification model including a neural network. The signal quality metrics may be processed by the neural network to identify patterns, relationships, types, sources or causes of the disturbances. At 806, the terminal device may receive an indication of one or more identified disruptions from the classification model. At 808, the terminal device may send an indication of the identified disruption to an upstream device of the data transfer network.

Figure 9:
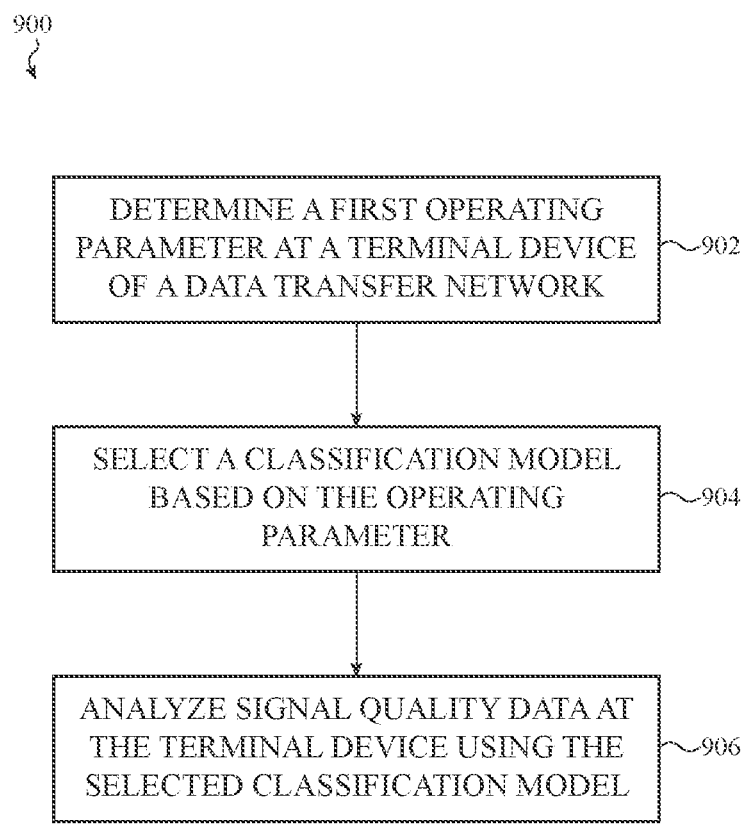
FIG. 9 is a flow chart that depicts example operations of a process of selecting a signal analysis model for detecting disruptions in a data transfer network, such as described herein.

FIG. 9 is a flow chart that depicts example operations of a process 900 of selecting a signal analysis model for detecting disruptions in a data transfer network. The process 900 may be implemented using the processes and methods such as described herein. Generally and broadly, a terminal device may be configured with multiple classification models, and the terminal device may select different ones of these classification models to use for analyzing received data signals. In some embodiments, a terminal device may select a classification model in different ways.

The process 900 provides an example of selecting a classification model based on an operational parameter of a terminal device. At 902, a first operating parameter of the terminal device may be determined. Example operating parameters may include a determined data throughput, data error rates, signal quality metrics, operating temperature, processing load, and so on. At 904, the terminal device may select a classification model based on the determined operating parameter. For example, if the processor of the terminal device has limited resources due to performing other operations, then the terminal device may select a classification model that uses less processor resources. At 906, the terminal device may execute the selected classification model to process the signal quality data. In some embodiments, the terminal device may continue to monitor parameters of the terminal device and update the classification model based on changes in one or more of these parameters.

Figure 10:
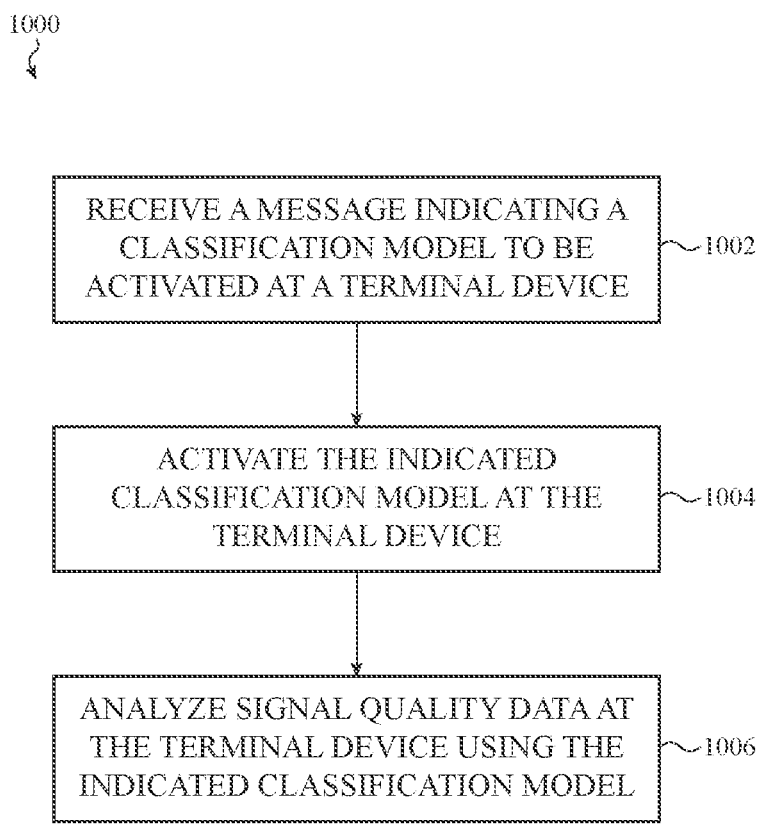
FIG. 10 is a flow chart that depicts example operations of a method for activating a signal analysis model at a remote terminal device in a data transfer network, such as described herein.

FIG. 10 is a flow chart that depicts an example process 1000 for virtually activating a signal analysis model at a remote device in a data transfer network. The process 1000 may be implemented using the processes, methods such as described herein.

Generally and broadly, configurations of the network maintenance system operating on a terminal device may be updated, activated, or otherwise modified using a virtual interface. For example, a terminal device may have a classification model with different configurations that can be activated or deactivated (either manually or in response to one of more parameters such as the operational parameters described herein).

At 1002, a terminal device may receive a message (e.g., from an upstream device) indicating a configuration of a classification model or a selection between different classification models to be activated at the terminal device. At 1004, in response to receiving the message, the terminal device may activate the indicated configuration or classification model. For example, an activated configuration may include activating different weighting parameters for use in a machine learning algorithm, which may be trained to detect certain types of disturbances. At 1006, the terminal device may use the activated features or selected classification model to process signal quality metrics determined by the terminal device.

Figure 11:
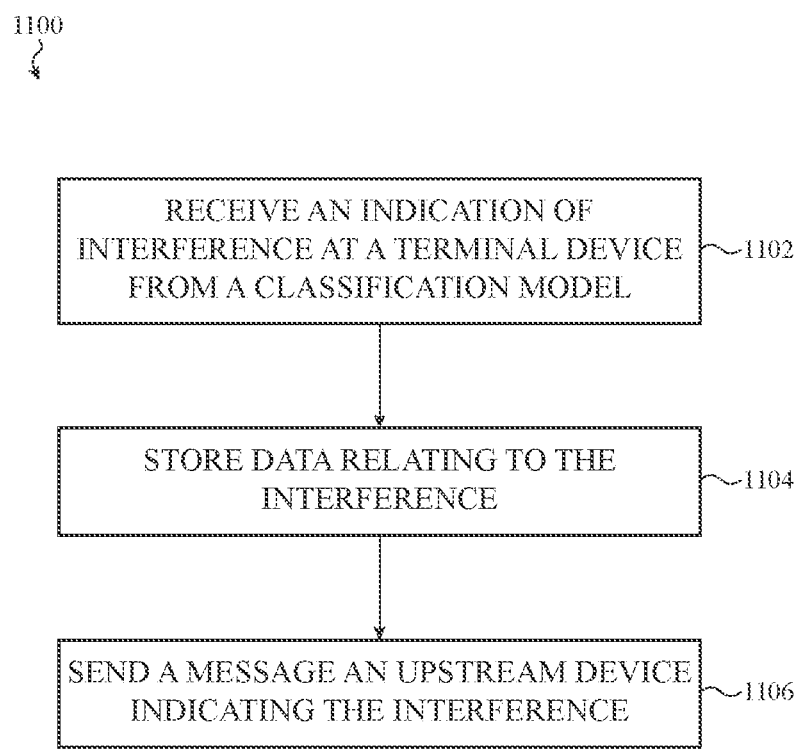
FIG. 11 is a flow chart that depicts example operations of a method for detecting interference and storing data relating to the interference at a terminal device of a data transfer network, such as described herein.

FIG. 11 is a flow chart that depicts an example process 1100 of detecting interference and storing data relating to the interference at a terminal device of a data transfer network. The process 1100 may be implemented using the processes and methods such as described herein.

Generally and broadly, a terminal device and/or upstream device may perform additional analyses upon detecting interference in data signals transmitted to terminal devices. In some cases, the additional analysis may be performed to isolate, localize, determine a type, cause, or source of interference, generate work orders, and so on. In other examples, additional analysis may be performed on identified disruptions to refine and/or provide training to one or more classification models used for proactive maintenance of a data transfer network.

Accordingly, a network maintenance system may implement processes—such as process 1100—for storing or caching network data (e.g., radio frequency spectrum data, throughput, noise, RxMER, pre-equalization data, and so on) to be used for additional analysis, network characterization, or computational model training. At 1102, a terminal device (or other network device such as an upstream server) may receive an indication that a terminal device is experiencing disruptions in signals received at the terminal device.

The terminal device (or other network device) may store data relating to the interference, which may include radio frequency spectrum data, signal quality metrics, types, sources, and/or causes of the interference, and the like. In some cases, the terminal device may store or cache the data for a pre-defined amount of time, for example while an initial analysis is performed on the received data signals.

For example, the data may be stored while the classification model analyzes the received data signals. If no disturbances are detected, then the data may be deleted, overwritten, or otherwise discarded to free memory of the device. If a disturbance is detected, then the data may be saved, moved to longer term storage on the device or transferred to other devices in the network for further processing. At 1106, the terminal device may send a message to an upstream device indicating identified interference and that it is holding data associated with the identified interference. In some cases, for example if the terminal device determines that it is about to lose service, the terminal device may proactively transfer the data to an upstream device.

Figure 12:
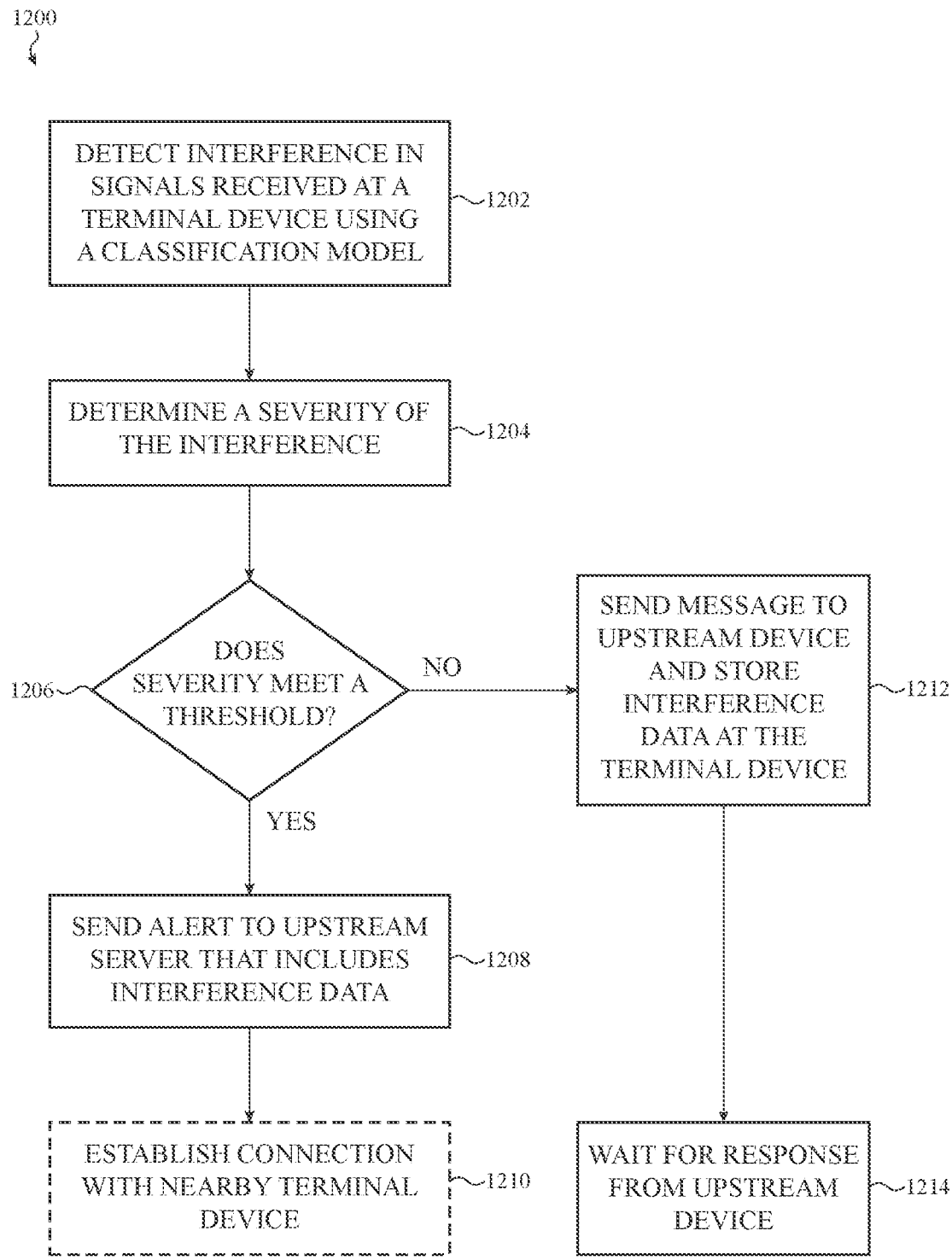
FIG. 12 is a flow chart that depicts example operations of a method for determining a course of action based on detecting interference at a terminal device of a data transfer network, such as described herein.

FIG. 12 is a flow chart that depicts an example process 1200 for determining a course of action based on detecting interference at a terminal device of a data transfer network. The process 1200 may be implemented using the processes, methods and systems such as described herein. The process 1200 illustrates how a terminal device may be configured to include different network disruption information and/or data in alerts or messages to upstream devices of a data transfer network. That is, a terminal device may be configured to include different information in alerts or messages sent to an upstream device based on data the terminal device collects or determines from data signals received by the terminal device.

At 1202, the terminal device may detect interference in received signals using a classification model such as described herein. At 1204, using output from the classification model and/or other signal disturbance data, the terminal device may determine a severity of the interference. For example, the terminal device may determine an effect of the identified disturbances on data throughput, an error rate for received data, signal to noise ratio, and so on. In some cases, the terminal device may monitor and analyze received data signals for a period of time to determine whether the disruptions are transient or creating ongoing issues.

At 1206, the terminal device may compare severity data to one or more thresholds to determine what actions to take in response to an identified disturbance. For example, the terminal device may determine whether a data throughput metric, signal to noise ratio, data error rate, or other metric satisfies a defined threshold.

At 1208, the terminal device may determine that the interference severity satisfies a defined threshold and sends an alert to an upstream server that includes the interference data. For example, the interference severity may indicate that the communication connection between the terminal device and upstream device is failing.

In this regard, the terminal device can be configured to send interference data to the upstream device before the communication connection fails. Accordingly, the upstream device may use the received interference data to determine a type, cause, or source of the interference and take actions to repair the communication connection with the terminal device.

At 1210, the terminal device may also establish a communication connection with a nearby terminal device is response to determining that the interference severity satisfies the threshold. This communication connection may be established using in-band resources such as a broadband cable network, out-of-band resources such as a wireless communication network, or a combination thereof. The terminal device may use this connection to communicate with the upstream server.

At 1212, the terminal device may determine that the interference severity does not satisfy a defined threshold and send a message to the upstream device indicating that signal interference was identified and that the terminal device is storing data associated with the interference. In these cases, at 1214, the terminal device may wait for a response or request from an upstream device before transmitting the interference data. For example, an upstream device may wait for a period in which extra network resources are available to request the interference data from the terminal device. Accordingly, non-critical communications such as transmitting low severity interference data may be transferred when extra resources are available, thereby increasing the efficiency of a data transfer network.

Figure 13:
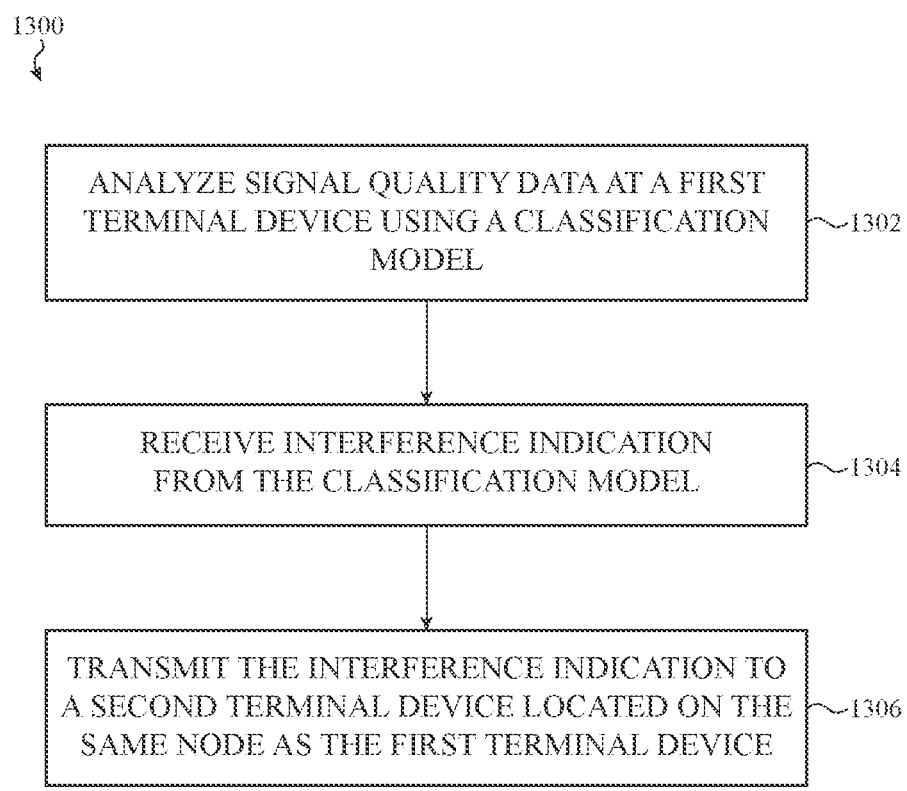
FIG. 13 is a flow chart that depicts example operations of a method for a first terminal device sending interference information to a second terminal device of a data transfer network, such as described herein.

FIG. 13 is a flow chart that depicts an example process 1300 of a first terminal device sending interference information to a second terminal device of a data transfer network. The process 1300 may be implemented using the processes and/or methods such as described herein. Generally and broadly, the network maintenance system described herein pushes detection of network disturbances to edge devices (e.g., terminal devices) of a data transfer network. As such, the edge devices may coordinate with each other to aid diagnosis of connectivity issues and provide advanced proactive maintenance.

The process 1300 provides one example of edge device coordinating to perform network maintenance operations. At 1302, a first terminal device may monitor received signal quality using the processes, methods, and systems described herein (e.g., using a classification model to identify a type, source, or cause of one or more disturbances). At 1304, a classification model operating on the first terminal device may identify interference in received data signals. At 1306, the first terminal device may transmit an indication of the identified interference to a second terminal device, for example, located on the same network node as the first terminal device.

In some embodiments, the second terminal device may indicate to the first terminal device whether it has identified similar or other interference events. The first terminal device may use this information to determine if the interference it experiences is isolated to itself or more widespread. The first terminal device may alert an upstream device if it determines that multiple devices are experiencing signal disturbances.

In some cases, the first terminal device may use the information from the second terminal device to perform additional analysis on received signal data (e.g., activating classification model features, other classification models, or the like), or coordinate with other terminal devices located on the same node to obtain additional information. Using such processes, edge devices of the network may coordinate to perform initial troubleshooting and maintenance of connectivity issues that may be provided to upstream devices.

Figure 14:
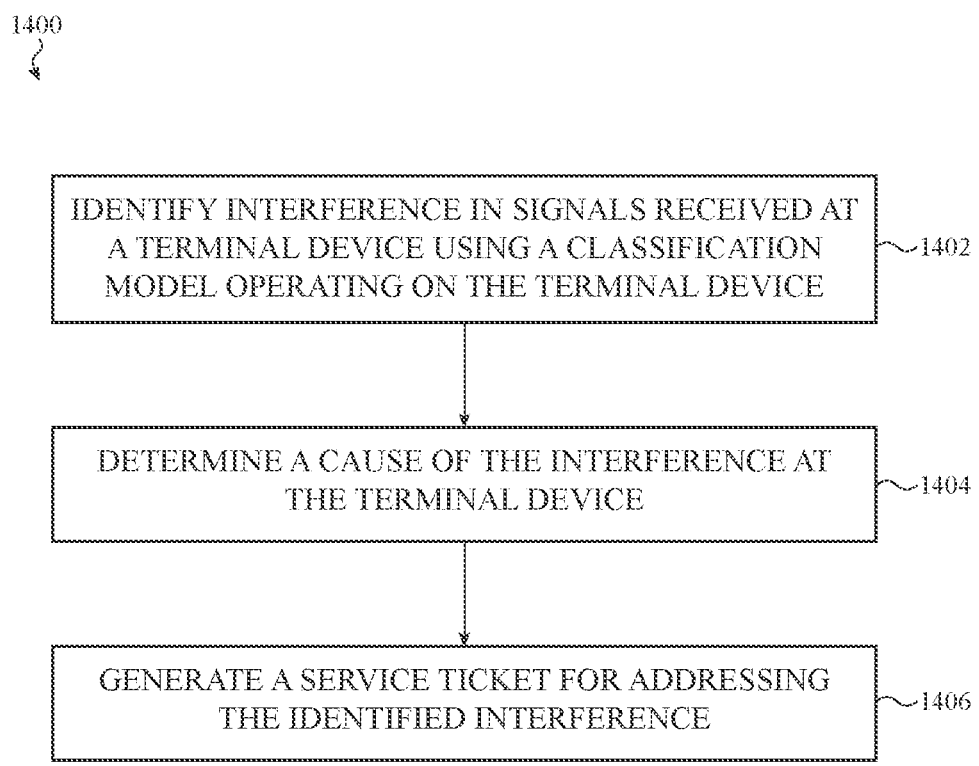
FIG. 14 is a flow chart that depicts example operations of a method for generating a service ticket for addressing detecting interference in a data transfer network.

FIG. 14 is a flow chart that depicts an example process 1400 of generating a service ticket for addressing and/or detecting interference in a data transfer network. The process 1400 may be implemented using the processes and methods such as described herein.

Generally and broadly, the network maintenance system described herein may use the disturbance data generated by a terminal device. At 1402, the classification models operating on the terminal device may be configured or trained to identify sources and/or causes of signal disturbances identified by one or more terminal devices and/or upstream devices such as described herein.

For example, a classification model may be trained to identify a disturbance as noise ingress from a wireless signal operating in defined spectrum bands (e.g., LTE frequency band, or the like). At 1404, the classification model may also be configured to identify that the wireless signal ingress is likely due to a shielding issue with the cable connecting the terminal device to the network.

Accordingly, at 1406, the network maintenance system may generate a field service ticket that includes these multiple layers of information. For example, that a first terminal device is experiencing signal interference, no other devices on the same node are experiencing the same issue, the sources of the interference are wireless signal ingress, and that the likely cause is a shielding issue in the cable input to the terminal device. In some cases, the field service ticket may indicate equipment or other hardware needed to make the repair.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources—only on informed consent of the subject of that data and/or information—should be accessed and aggregated only for legitimate, agreed-upon, and reasonable uses.

What is claimed is:

1. A method for identifying and classifying an interference affecting signals received from a data transfer network at a modem, the method comprising:
   defining an array of signal quality metrics, each signal quality metric associated with a respective subcarrier of a data channel used to transact information with the data transfer network;
   providing the array of signal quality metrics as input to a classification model;
   receiving from the classification model a label corresponding to an identified interference with normal operation of the data transfer network, the label comprising at least one of:
   a center frequency of the identified interference;
   a bandwidth of the identified interference; or
   a source of the identified interference; and
   transmitting a message to an upstream device of the data transfer network, the message comprising the label.

2. The method of claim 1, wherein:
   the modem comprises a terminal device of the data transfer network;
   the upstream device comprises a modem termination system of the data transfer network; and
   the classification model is executed on the modem.

3. The method of claim 2, wherein:
   the array of signal quality metrics comprise modulation error ratios for the signals received at the modem; and
   the classification model is configured to output the label at least partially based on identifying interference from the modulation error ratios of the signals received at the modem.

4. The method of claim 1, wherein transmitting the message further comprises transmitting a time associated with the signals received at the modem.

5. The method of claim 1, wherein the label comprises one or more of a wireless signal ingress, a roll-off, a roll-up, channel sweeping, suck-out, or a standing wave.

6. The method of claim 1, further comprising:
   receiving, from the classification model, an identifier of a root cause of the identified interference, the identifier of the root cause associated with one or more physical components of the data transfer network; and
   sending the identifier of the root cause to the upstream device of the data transfer network.

7. The method of claim 1, wherein:
   the classification model comprises a convolutional neural network configured to operate on the modem of the data transfer network; and
   the convolutional neural network is configured to identify the interference affecting the signals using the array of signal quality metrics and output the label corresponding to the source of the identified interference.

8. The method of claim 7, wherein the convolutional neural network comprises:
   an executable program; and
   a parameter model used by the executable program to configure the convolutional neural network to identify the interference affecting the signals.

9. The method of claim 1, further comprising:
   receiving, from the upstream device, a request for additional information associated with a detected interference; and
   sending, to the upstream device, at least a portion of the array of signal quality metrics associated with an anomaly.

10. The method of claim 1, further comprising:
    receiving, from the upstream device, a request to perform additional analysis on one or more data channels in the data transfer network.

11. The method of claim 1, wherein the array of signal quality metrics is one or more signal quality metrics.

12. The method of claim 1, wherein the modem is selected from the group consisting of satellite modem, a cable modem, an Optical Network Units (ONU), a DSL unit, a Remote Radio Head (RRH), eNodeB, gNodeB, small cell.

13. The method of claim 1, wherein the upstream device is selected from the group consisting of cable modem termination system (CMTS), an Optical Network Terminal (ONT), an Optical line termination (OLT), a Network Termination Units, a Mobile Core, and a Satellite Termination Units.

14. A method for identifying disruptions in signals received at a network terminal, the method comprising:
    determining an array of signal quality metrics for one or more data channels in a data transfer network, each signal quality metric associated with a respective subcarrier of a data channel used to transfer information over the data transfer network;
    receiving the array of signal quality metrics at a classification model operating on the network terminal, the classification model comprising a neural network;
    outputting, from the classification model, a label of a disruption affecting the signals received at the network terminal, the label indicating a source of the disruption identified by the neural network; and transmitting a notification of an identified disruption to an upstream device of the data transfer network.

15. The method of claim 14, wherein determining the array of signal quality metrics comprises calculating a modulation error ratio for each signal quality metric in the array of signal quality metrics.

16. The method of claim 14, wherein:
the classification model comprises a one-dimensional convolutional neural network; and
identifying the disruption comprises training the one-dimensional convolutional neural network to recognize the disruption in the array of signal quality metrics.

17. The method of claim 14, further comprising receiving, from the classification model, an indication of a cause of the identified disruption.

18. The method of claim 17, further comprising transmitting the indication of the cause of the identified disruption to the upstream device.

19. The method of claim 14, wherein the label comprises a wireless signal ingress, a roll-off, channel sweeping, a standing wave, or a combination thereof.

20. The method of claim 14, wherein transmitting the label to the upstream device further comprises indicating a severity of the disruption in the signals.

21. The method of claim 14, wherein the array of signal quality metrics is one or more signal quality metrics.

22. The method of claim 14, wherein the network terminal is selected from the group consisting of satellite modem, a cable modem, an Optical Network Units (ONU), a DSL unit, a Remote Radio Head (RRH), eNodeB, gNodeB, small cell.

23. The method of claim 14, wherein the upstream device is selected from the group consisting of cable modem termination system (CMTS), an Optical Network Terminal (ONT), an Optical line termination (OLT), a Network Termination Units, a Mobile Core, and a Satellite Termination Units.

24. A networked interference identifying system for identifying interference in a data transfer network, the networked interference identifying system comprising:
an upstream device transferring data using data channels to transact information over the data transfer network; and
a terminal device communicably coupled to the upstream device via the data transfer network and comprising a processor configured to:
receive the data from the upstream device via the data channels;
determine an array of signal quality metrics associated with subcarriers of the data channels;
provide the array of signal quality metrics as input to a classification model;
receive, from the classification model, a label characterizing a type of interference affecting the data received at the terminal device; and
transmit a message to the upstream device indicating that the type of interference was detected in the data.

25. The networked interference identifying system of claim 24, wherein the classification model comprises a convolutional neural network configured to identify the type of interference as one of a set of known interference types.

26. The networked interference identifying system of claim 25, wherein the convolutional neural network comprises:
an executable file configured to analyze the array of signal quality metrics; and
a parameter model utilized by the executable file to configure one or more nodes of the convolutional neural network to identify the type of interference in the array of signal quality metrics.

27. The networked interference identifying system of claim 24, wherein the array of signal quality metrics is one or more signal quality metrics.

28. The networked interference identifying system of claim 24, wherein the terminal device is selected from the group consisting of satellite modem, a cable modem, an Optical Network Units (ONU), a DSL unit, a Remote Radio Head (RRH), eNodeB, gNodeB, small cell.

29. The networked interference identifying system of claim 24, wherein the upstream device is selected from the group consisting of cable modem termination system (CMTS), an Optical Network Terminal (ONT), an Optical line termination (OLT), a Network Termination Units, a Mobile Core, and a Satellite Termination Units.

* * * * *